United States Patent [19]
Ogawa et al.

[11] Patent Number: 5,215,061
[45] Date of Patent: Jun. 1, 1993

[54] CONTROL SYSTEM FOR INTERNAL COMBUSTION ENGINES

[75] Inventors: Ken Ogawa; Kotaro Miyashita; Yoshihisa Hara, all of Wako, Japan

[73] Assignee: Honda Giken Kogyo Kabushiki Kaisha, Tokyo, Japan

[21] Appl. No.: 945,489

[22] Filed: Sep. 16, 1992

[30] Foreign Application Priority Data

Oct. 3, 1991 [JP] Japan .................... 3-283694
Oct. 7, 1991 [JP] Japan .................... 3-287122
Oct. 24, 1991 [JP] Japan .................... 3-305297

[51] Int. Cl.$^5$ .............. F02D 41/04; F01L 1/34; F02M 25/08; F02M 23/12
[52] U.S. Cl. ................ 123/478; 123/90.15; 123/492; 123/520; 123/585
[58] Field of Search .......... 123/90.15, 472, 478, 123/480, 492, 493, 520, 557, 585

[56] References Cited

U.S. PATENT DOCUMENTS

| | | | |
|---|---|---|---|
| 4,357,923 | 11/1982 | Hideg .................... | 123/492 |
| 4,388,906 | 6/1983 | Sugiyama et al. ........ | 123/492 |
| 4,481,928 | 11/1984 | Takinoto et al. ........ | 123/492 |
| 4,852,538 | 8/1989 | Nagaishi ................ | 123/492 |
| 5,086,744 | 2/1992 | Ishihara et al. ........ | 123/480 |
| 5,134,983 | 8/1992 | Kusunoki et al. ........ | 123/492 |

FOREIGN PATENT DOCUMENTS

55-9555 3/1980 Japan .
61-126337 6/1986 Japan .
2-50285 11/1990 Japan .

*Primary Examiner*—Tony M. Argenbright
*Attorney, Agent, or Firm*—Lyon & Lyon

[57] ABSTRACT

A control system for an internal combustion engine estimates an amount of adherent fuel adhering to the inner surface of the intake passage, as well as an amount of carried-off fuel evaporated from fuel adhering to the inner surface of the intake passage and carried into combustion chambers, determines an amount of supply fuel to be supplied to the engine, based upon operating conditions of the engine, the estimated adherent fuel amount, and the estimated carried-off fuel amount, and supplies the determined supply fuel amount into the intake passage. The control systems corrects the estimated adherent fuel amount and the estimated carried-off fuel amount, in response to an intake parameter which is changeable within the intake passage. The intake parameter includes an amount of evaporative fuel purged, valve operating characteristics of intake valves and/or exhaust valves, an amount of assist air supplied to fuel injection valves.

10 Claims, 19 Drawing Sheets

FOR LOW V/T

FOR HIGH V/T

CONTROL SYSTEM FOR INTERNAL COMBUSTION ENGINES

BACKGROUND OF THE INVENTION

1. Field of the Invention

This invention relates to a control system for internal combustion engines, and more particularly to a control system which controls the supply of fuel injected into an intake pipe in a manner compensating for a fuel amount adhering to the inner surface of the intake pipe.

2. Prior Art

In conventional internal combustion engines of the type that fuel is injected into an intake pipe, there is a problem that some of injected fuel adheres to the inner surface of the intake pipe, so that a required amount of fuel cannot be drawn into the combustion chamber. To solve this problem, there has been proposed a fuel supply control method which estimates a fuel amount which is to adhere to the inner surface of the intake pipe and one which is to be drawn into the combustion chamber by evaporation from the fuel adhering to the intake pipe, and determines a fuel injection amount in dependence on the estimated fuel amounts (Japanese Provisional Patent Publication (Kokai) No. 61-126337).

On the other hand, conventionally, evaporative fuel emission control systems have been widely used in internal combustion engines, which operate to prevent evaporative fuel from being emitted from a fuel tank into the atmosphere, by temporarily storing evaporative fuel from the fuel tank in a canister, and purging same into the intake system of the engine. Purging of evaporative fuel into the intake system causes fluctuations in the air-fuel ratio of a mixture supplied to the combustion chamber. To prevent such fluctuations in the air-fuel ratio or a deviation thereof from a desired value due to purging of evaporative fuel, it has also been proposed to estimate an amount of evaporative fuel to be purged, and determine a fuel injection amount based on the estimated evaporative fuel amount (Japanese Provisioned Patent Publications (Kokai) Nos. 1-148043 and 2-27167).

Further, conventionally internal combustion engines are known, in which operating characteristics of intake valves and exhaust valves, i.e., valve timing (valve opening/closing timing and/or valve lift) are changeable, (e.g. Japanese Provisional Patent Publication (Kokai) No. 2-50285).

Furthermore, a fuel injection system is known, in which air (so-called assist-air) is supplied to the fuel injection valves through ports provided in the vicinity thereof to promote atomization of fuel injected from the fuel injection valves (e.g. Japanese Provisional Patent Publication (Kokoku) No. 55-9555).

The above proposed or known systems or methods are intended to solve their respective problems alone. However, in actuality, unless all the problems are solved at the same time, the air-fuel ratio of a mixture supplied to an internal combustion engine cannot be accurately controlled to a desired value. In any event, at least the problem of adherence of fuel to the inner surface of the intake pipe has to be taken into consideration in solving the problems mentioned above. However, a mere combination of two or more of the above-mentioned systems or methods cannot lead to successful control of the air-fuel ratio.

SUMMARY OF THE INVENTION

It is an object of the invention to provide a control system for an internal combustion engine, which is capable of accurately controlling the air-fuel ratio of a mixture supplied to combustion chambers of the engine, by taking into consideration the amount of fuel adhering to the inner surface of the intake pipe as well as an intake pipe parameter within the intake passage.

A further object of the invention is to provide a control system for an internal combustion engine, which is capable of accurately controlling the air-fuel ratio, by taking into consideration the amount of fuel adhering to the inner surface of the intake pipe as well as the valve timing of intake valves and/or the exhaust valves thereof.

Another object of the injection is to provide a control system which is capable of accurately controlling the air-fuel ratio, by taking into consideration the amount of fuel adhering to the inner surface of the intake pipe as well as the amount of evaporative fuel purged.

Still another object of the invention is to accurately control the air-fuel ratio in dependence on the amount of fuel adhering to the intake pipe inner surface as well as the amount of auxiliary air (assist air) supplied to the fuel injection valves.

To attain the first-mentioned object, the present invention provides a control system for an internal combustion engine having at least one combustion chamber, an intake passage having an inner surface, and intake parameter changing means for changing an intake parameter within the intake passage, comprising:

operating condition detecting means for detecting operating conditions of the engine;

adherent fuel amount estimating means for estimating an amount of adherent fuel adhering to the inner surface of the intake passage;

carried-off fuel amount estimating means for estimating an amount of carried-off fuel evaporated from fuel adhering to the inner surface of the intake passage and carried into the combustion chamber;

supply fuel amount determining means for determining an amount of supply fuel to be supplied to the engine, based upon operating conditions of the engine detected by the operating condition detecting means, the adherent fuel amount estimated by the adherent fuel amount estimating means, and the carried-off fuel amount estimated by the carried-off fuel amount estimating means;

fuel supply means for supplying the supply fuel amount determined by the supply fuel amount determining means into the intake passage; and estimated fuel amount correcting means for correcting the adherent fuel amount estimated by the adherent fuel amount estimating means, and the carried-off fuel amount estimated by the carried-off fuel amount estimating means, in response to the intake parameter changed by the intake parameter changing means.

To attain the second object, the present invention provides a control system for an internal combustion engine having at least one combustion chamber, an intake passage having an inner surface, a fuel tank, a canister for adsorbing evaporative fuel generated from the fuel tank, and a purging passage connecting between the canister and the intake passage, the control system including supply fuel amount calculating means for calculating an amount of supply fuel to be supplied to the engine, based upon operating conditions of the engine;

adherent fuel amount estimating means for estimating an amount of adherent fuel adhering to the inner surface of the intake passage, carried-off fuel amount estimating means for estimating an amount of carried-off fuel amount evaporated from fuel adhering to the inner surface of the intake passage and carried into the combustion chamber, supply fuel amount correction means for correcting the supply fuel amount calculated by the supply fuel amount calculating means, in response to the adherent fuel amount estimated by the adherent fuel amount estimating means and the carried-off fuel amount estimated by the carried-off fuel amount estimating means, and fuel supply means for supplying the supply fuel amount corrected by the supply fuel amount correcting means into the intake passage, the system being characterized by an improvement comprising:

(1) evaporative fuel amount detecting means for detecting an amount of evaporative fuel supplied to the intake passage via the purging passage; and (2) estimated fuel amount correcting means for correcting the adherent fuel amount estimated by the adherent fuel amount estimating means and the carried-off fuel amount estimated by the carried-off fuel amount estimating means, in response to the evaporative fuel amount detected by the evaporative fuel amount detecting means.

Preferably, the estimated fuel amount correcting means corrects the adherent fuel amount and the carried-off fuel amount in response to concentration of hydrocarbon in the evaporative fuel supplied to the intake passage via the purging passage and a flow rate of the evaporative fuel.

To attain the third object, the prevent invention provides a control system for an internal combustion engine having at least one combustion chamber, an intake passage having an inner surface, at least one intake valve, at least one exhaust valve, and valve operating means for changing a valve operating characteristic of at least one of the intake valve and the exhaust valve, the control system including supply fuel amount calculating means for calculating an amount of fuel to be supplied to the engine, based upon operating conditions of the engine, adherent fuel amount estimating means for estimating an amount of adherent fuel adhering to the inner surface of the intake passage, carried-off fuel amount estimating means for estimating an amount of caried-off fuel evaporated from fuel adhering to the inner surface of the intake passage and carried into the combustion chamber, supply fuel amount correcting means for correcting the supply fuel amount calculated by the supply fuel amount calculating means, based upon the adherent fuel amount estimated by the adherent fuel amount estimating means and the carried-off fuel amount estimated by the carried-off fuel amount estimating means, and fuel supply means for supplying the supply fuel amount corrected by the fuel amount correcting means into the intake passage, the system being characterized by an improvement comprising:

estimated fuel amount correcting means for correcting the adherent fuel amount estimated by the adherent fuel amount estimating means and the carried-off fuel amount estimated by the carried-off fuel amount estimating means, in response to the valve operating characteristic of the at least one the intake valve and the exhaust valve.

Preferably, the valve operating characteristic includes a low speed valve timing suitable for operation of the engine in a lower rotational speed region of the engine, and a high speed valve timing suitable for operation of the engine in a higher rotational speed region of the engine, the adherent fuel amount and the carried-off fuel amount being each corrected to different values between when the low speed valve timing is selected and when the high speed valve timing is selected.

To attain the fourth object, the present invention provides a control system for an internal combustion engine having at least one combustion chamber, and an intake passage, including supply fuel amount calculating means for calculating an amount of supply fuel amount calculating means for calculating an amount of fuel to be supplied to the engine, based upon operating conditions of the engine, adherent fuel amount estimating means for estimating an amount of adherent fuel adhering to the inner surface of the intake passage, carried-off fuel amount estimating means for estimating an amount of carried-off fuel evaporated from fuel adhering to the inner surface of the intake passage and carried into the combustion chamber, supply fuel amount correcting means for correcting the supply fuel amount calculated by the supply fuel amount calculating means, based upon the adherent fuel amount estimated by the adherent fuel amount estimating means and the carried-off fuel amount estimated by the carried-off fuel amount estimating means, fuel injection means for injecting the supply fuel amount corrected by the supply fuel amount correcting means into the intake passage, the fuel injection means having an injection port, and auxiliary air supply means for supplying auxiliary air to the fuel injection means at a zone in the vicinity of the injection port, the system being characterized by an improvement comprising:

estimated fuel amount correcting means for correcting the adherent fuel amount estimated by the adherent fuel amount estimating means and the carried-off fuel amount estimated by the carried-off fuel amount estimating means, in response to an amount of the auxiliary air supplied by the auxiliary air supply means.

Preferably, the fuel injection means has heating means for heating fuel injected by the fuel injection means, the estimated fuel amount correcting means correcting the adherent fuel amount and the carried-off fuel amount, based upon an amount of heating calory generated by the heating means.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
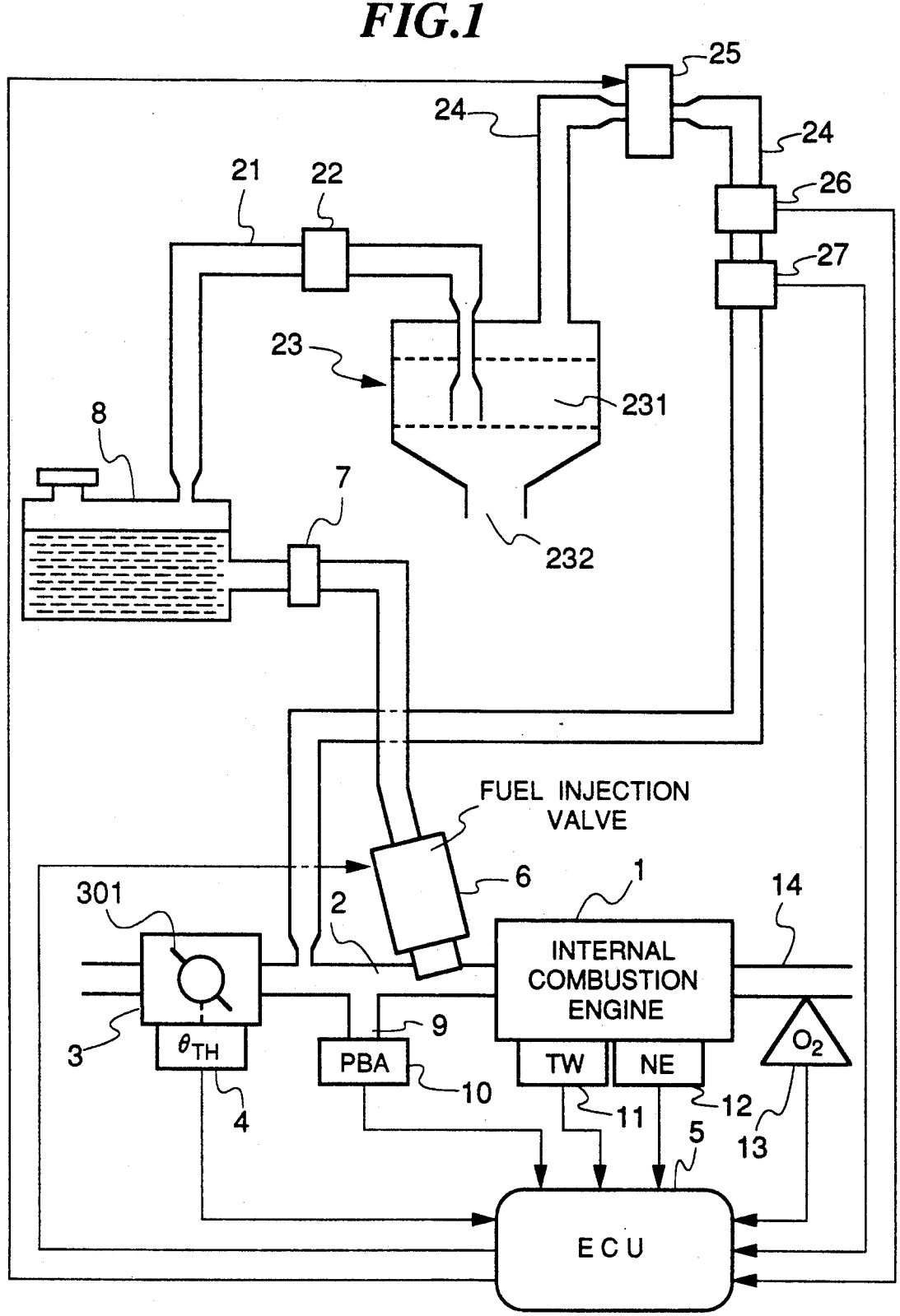
FIG. 1 is a block diagram showing the whole arrangement of a fuel supply control system for an internal combustion engine, according to a first embodiment of the invention.

Referring first to FIG. 1, there is illustrated the whole arrangement of a fuel supply control system of an internal combustion engine, according to a first embodiment of the invention. In the figure, reference numeral 1 designates an internal combustion engine for automotive vehicles. The engine is a four-cylinder type, for instance. Connected to the cylinder block of the engine 1 is an intake pipe 2 across which is arranged a throttle body 3 accommodating a throttle valve 301 therein. A throttle valve opening ($\theta_{TH}$) sensor 4 is connected to the throttle valve 301 for generating an electric signal indicative of the sensed throttle valve opening and supplying same to an electronic control unit (hereinafter called "the ECU") 5.

Fuel injection valves 6, only one of which is shown, are inserted into the interior of the intake pipe 2 at locations intermediate between the cylinder block of the engine 1 and the throttle valve 301 and slightly upstream of respective intake valves, not shown. The fuel injection valves 6 are connected to a fuel tank 8 via a fuel pump 7, and electrically connected to the ECU 5 to have their valve opening periods controlled by signals therefrom.

On the other hand, an intake pipe absolute pressure (PBA) sensor 10 is provided in communication with the interior of the intake pipe 2 via a conduit 9 at a location immediately downstream of the throttle valve 301 for supplying an electric signal indicative of the sensed absolute pressure within the intake pipe 2 to the ECU 5.

An engine coolant temperature (TW) sensor 11 is mounted in the cylinder block of the engine 1, for supplying an electric signal indicative of the sensed engine coolant temperature TW to the ECU 5. An engine rotational speed (NE) sensor 12 is arranged in facing relation to a camshaft or a crankshaft of the engine 1, not shown. The engine rotational speed sensor 12 generates a pulse as a TDC signal pulse at each of predetermined crank angles whenever the crankshaft rotates through 180 degrees, the pulse being supplied to the ECU 5.

An $O_2$ sensor 13 as an exhaust gas ingredient concentration sensor is mounted in an exhaust pipe 14 connected to the cylinder block of the engine 1, for sensing the concentration of oxygen present in exhaust gases emitted from the engine 1 and supplying an electric signal indicative of the detected value of the oxygen concentration to the ECU 5.

An evaporative fuel emission control system is arranged between the fuel tank 8 and the intake pipe 2. More specifically, a conduit line (purging passage) 24 extends from an upper space inn the fuel tank 8 which has an enclosed body and opens into interior of a canister 23 having an adsorbent 231. A two-way valve 22 is arranged across the conduit line 21. A purging passage 24 extends from the canister 23 and opens into the interior of the intake pipe 2 at a location of the throttle valve 3. Arranged across the purging passage 24 are a purge control valve 25, which is a linear control valve (EPCV) having a solenoid for actuating a valve element thereof, a flowmeter 26 which detects a flow rate VP of an air-fuel mixture containing evaporative fuel, flowing through the purge passage 24 (hereinafter referred to as "purging flow rate"), and a HC (hydrocarbon) concentration sensor 27 for sensing the concentration of HC in the air-fuel mixture. The solenoid of the purge control valve 25 is electrically connected to the ECU 5 to be controlled by a control signal therefrom to linearly vary its valve opening.

Evaporative fuel or gas (hereinafter merely referred to as "evaporative fuel") generated within the fuel tank 8 forcibly opens a positive pressure valve, not shown, of the two-way valve 22 when the pressure of the evaporative fuel reaches a predetermined level, to flow through the valve 22 into the canister 23, where the evaporative fuel is adsorbed by the adsorbent 231 in the canister and thus stored therein. The purge control valve 25 is a so-called on-off control type solenoid valve, which has its valve opening linearly variable in response to the duty ratio of a control signal from the ECU 5, i.e. the ratio between the valve opening period and the valve closing period. Thus, the purge control valve 25 is opened to a valve opening corresponding to the duty ratio of the control signal from the ECU 5, whereby evaporative fuel temporarily stored in the canister 23 flows therefrom together with fresh air introduced through an outside air-introducing port 232 of the canister 23 at the flow rate determined by the valve opening of the purge control valve 25, through the purging passage 24 into the intake pipe 2 to be supplied to the cylinders. When the fuel tank 8 is cooled due to low ambient temperature etc. so that negative pressure increases within the fuel tank 8, a negative pressure valve, not shown, of the two-way valve 22 is opened to return evaporative gas temporarily stored in the canister 23 into the fuel tank 8. In the above described manner, the evaporative fuel generated within the fuel tank 8 is prevented from being emitted into the atmosphere.

The ECU 5 comprises an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") which executes programs for controlling the fuel injection valves 6 and the purge control valve 25, etc., memory means storing maps and tables, referred to hereinafter, and various operational programs which are executed in the CPU and for storing results of calculations therefrom, etc., and an output circuit which outputs control or driving signals to the fuel injection valves 6 and the purge control valves 25.

Figure 2:
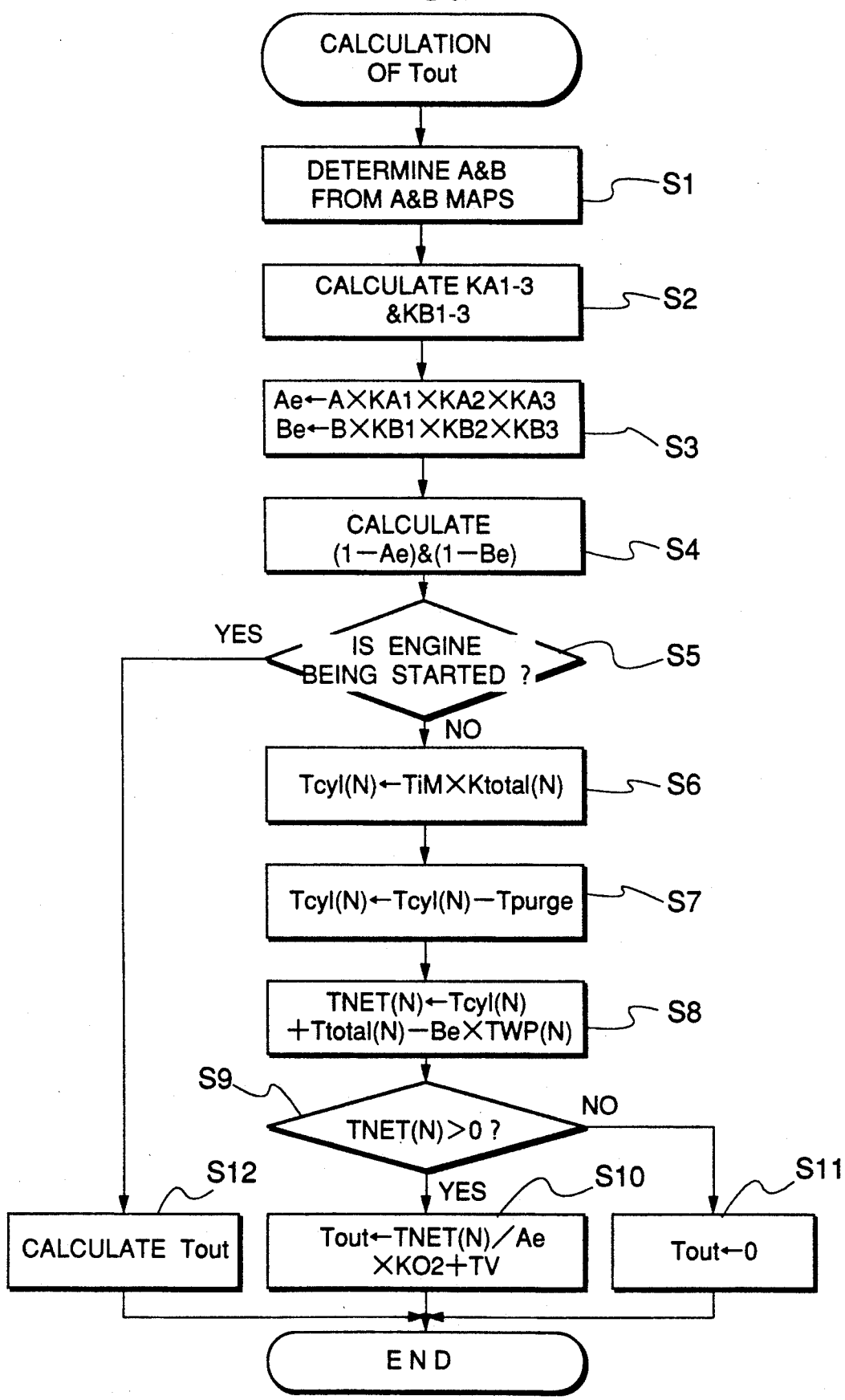
FIG. 2 is a flowchart of a program for calculating a fuel injection period Tout.

The CPU operates in response to the above-mentioned signals from the sensors to determine operating conditions in which the engine 1 is operating, such as an air-fuel ratio feedback control region in which the fuel supply is controlled in response to the detected oxygen concentration in the exhaust gases, and open-loop control regions, and calculates, based upon the determined operating conditions, the valve opening period or fuel injection period Tout over which the fuel injection valves 6 are to be opened, by the use of the program of FIG. 2 in synchronism with inputting of TDC signal pulses to the ECU 5.

The CPU supplies via the output circuit the driving signals based upon the fuel injection period Tout determined as above to the fuel injection valves 6 to open same over the fuel injection period Tout. The fuel injection period Tout is proportional to the fuel injection amount, and therefore will be hereinafter referred to as the fuel injection amount.

FIG. 2 shows the program for calculating the fuel injection amount Tout. This program is executed upon generation of each TDC signal pulse and in synchronism therewith.

At a step S1, a direct supply ratio A and a carry-off ratio B are calculated. The direct supply rate A is defined as a ratio of a fuel amount directly or immediately drawn into a combustion chamber to the whole fuel amount injected in a cycle, the direct supply ratio including a fuel amount carried off the inner surface of the intake pipe 2 by evaporation etc., in the same cycle. The carry-off ratio B is defined as a ratio of a fuel amount carried off the inner surface of the intake pipe 2 by evaporation etc. and drawn into the combustion chamber in the present cycle to the whole fuel amount which adhered to the inner surface of the intake pipe 2 in the last or immediately preceding cycle. The direct supply ratio A and the carry-off ratio B are read, respectively, from an A map and a B map set in accordance with coolant temperature TW and intake pipe absolute pressure PBA, in response to the detected TW and PBA values. The direct supply ratio A and the carry-off ratio B may be calculated by interpolation, if required.

Figure 4A:
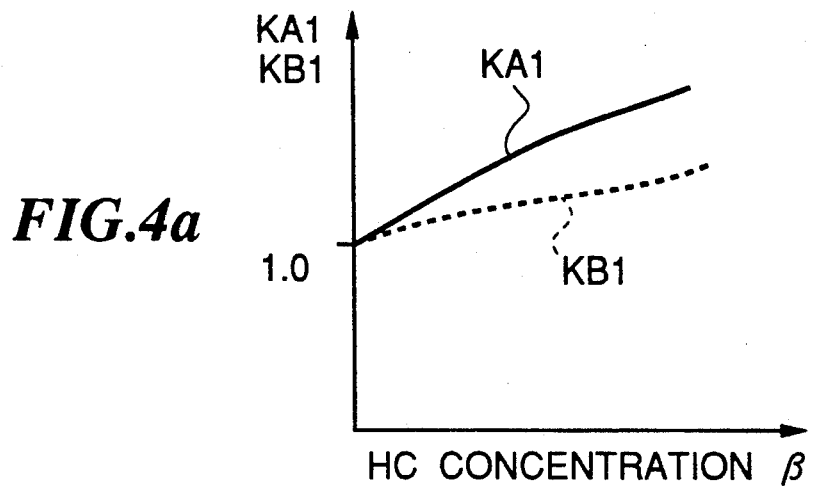
FIGS. 4(a), (b), and (c) show tables for calculating correction coefficients for correcting a direct supply ratio A and a carry-off ratio B.
Figure 4B:
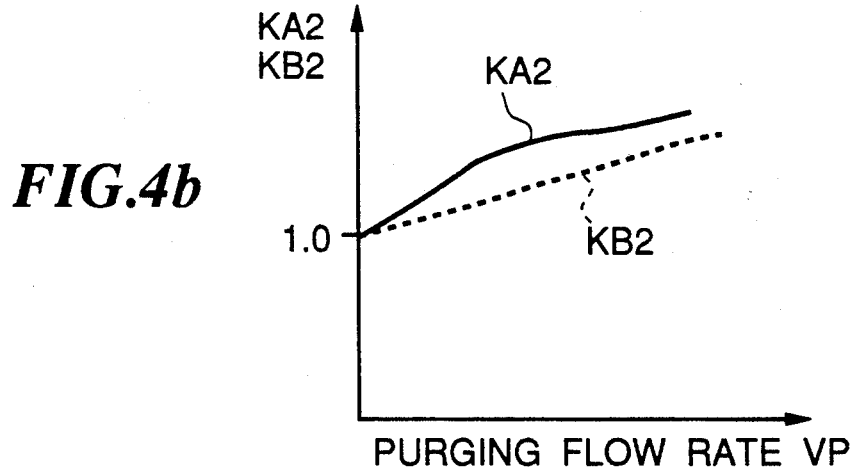

At the next step S2, first, second and third correction coefficients KA1 to KA3 and KB1 to KB3, which correct the direct supply ratio A and the carry-off ratio B, are calculated. The first correction coefficients KA1 and KB1 are determined in response to the HC concentration $\beta$ detected by the HC concentration sensor 27, as shown in FIG. 4(a). The second correction coefficients KA2 and KB2 are determined in response to the purging flow rate VP detected by the flowmeter 26, as shown in FIG. 4(b). Therefore, (KA1×KA2) and (KB1×KB2) assume values representing ($\beta$×VP), i.e., an amount of evaporative fuel flowing through the purging passage 24. According to FIG. 4(a), as the HC concentration $\beta$ increases, the first correction coefficients KA1 and KB1 are increased. This is because, when the evaporative fuel amount which is supplied to the intake pipe 2 increases, the direct supply ratio A and the carry-off ratio B apparently increase. The setting of the second correction coefficients KA2 and KB2 in FIG. 4(b) is based upon a similar ground.

Figure 4C:
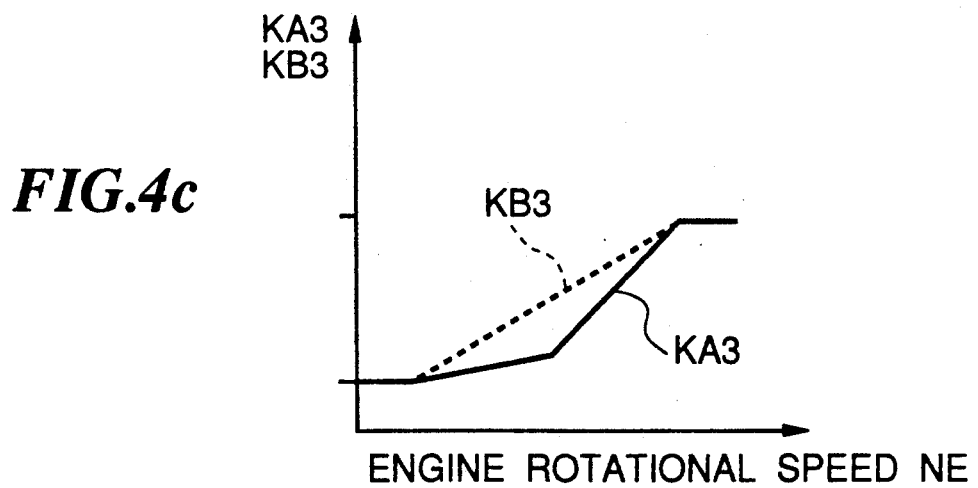

The third correction coefficients KA3 and KB3 are determined in response to the engine rotational speed NE, as shown in FIG. 4(c). Specifically, according to FIG. 4(c), the correction coefficient KA3 for correcting the direct supply ratio A is set such that it increases as the engine rotational speed NE increases. The third correction coefficient KB3 for correcting the carry-off ratio B is set likewise.

The reason why the third correction coefficients KA3 and KB3 are thus increased as the engine rotational speed NE increases is that the direct supply ratio A and the carry-off ratio B apparently increase as the intake air flow speed in the intake pipe increases with an increase in the engine rotational speed NE.

Next, at a step S3, corrected values Ae and Be of the direct supply ratio and the carry-off ratio are calculated by the use of the following equations (1) and (2). Further, (1−Ae) and (1−Be) are calculated at a step S4, followed by the program proceeding to a step S5:

$$Ae = A \times KA1 \times KA2 \times KA3 \quad (1)$$

$$Be = B \times KB1 \times KB2 \times KB3 \quad (2)$$

where the values Ae, (1−Ae) and (1−Be) thus calculated are stored into a RAM of the ECU 5 for use in a program shown in FIG. 3, which will be described hereinafter.

At a step S5, it is determined whether or not the engine is being started. If the answer is affirmative (YES), the fuel injection amount Tout is calculated based upon a basic fuel amount Ti for use at the start of the engine, and then the program is terminated. If the answer to the question of the step S5 is negative (NO), i.e., if the engine is not being started, a required fuel amount TCYL(N) for each cylinder, which does not include an additive correction term Ttotal, referred to hereinafter, is calculated by the use of the following equation (3), at a step S6:

$$Tcyl(N) = TiM \times Ktotal\,(N) \quad (3)$$

where (N) represents a number allotted to the cylinder for which the required fuel amount Tcyl is calculated. TiM represents a basic fuel amount to be applied when the engine is under normal operating conditions (other than the starting condition) and is calculated in response to the rotational speed NE and the intake pipe absolute pressure PBA. Ktotal(N) represents the product of all correction coefficients (e.g. a coolant temperature-dependent correction coefficient KTW and a leaning correction coefficient KLS) which are calculated based upon engine operating parameter signals from various sensors excluding an air-fuel ratio correction coefficient KO2 which is calculated based on an output signal from the O$_2$ sensor 18.

At a step S7, the required fuel amount TCYL(N) calculated above is corrected by applying a purging correction variable Tpurge to the following equation (4). The purging correction variable Tpurge represents a fuel injection period corresponding to an evaporative fuel amount calculated based upon outputs from the flowmeter 26 and the HC sensor 27:

$$Tcyl(N) = Tcyl(N) - Tpurge \quad (4)$$

At a step S8, a combustion chamber supply fuel amount TNET, which should be supplied to the corresponding combustion chamber in the present injection cycle, is calculated by the use of the following equation (5):

$$TNET = Tcyl(N) + Ttotal - Be \times TWP(N) \quad (5)$$

where Ttotal is the sum of all additive correction terms (e.g. an acceleration fuel-increasing correction term TACC), which is calculated based on engine operating parameter signals from various sensors. The value Ttotal does not include an ineffective time correction term TV, refered to later. TWP(N) represents an intake pipe-adherent fuel amount (estimated value), which is calculated by the program of FIG. 3. (Be×TWP(N)) corresponds to an amount of fuel, which is evaporated from fuel adhering to the inner surface of the intake pipe 2 and carried into the combustion chamber. A fuel amount corresponding to the fuel amount carried off the intake pipe inner surface need not be injected, and, therefore, is to be subtracted from the value Tcyl(N) in the equation (5).

At a step S9, it is determined whether or not the value TNET calculated by the equation (5) is larger than a value of 0. If the answer is negative (NO), i.e., if TNET≦0, the fuel injection amount Tout is set to 0, followed by terminating the program. If the answer at the step S9 is affirmative (YES), i.e., if TNET>0, the TOUT value is calculated by the use of the following equation (6):

$$Tout = TNET(N)/Ae \times KO2 + TV \quad (6)$$

where KO2 is the aforementioned air fuel ratio correction coefficient calculated in response to the output from the O$_2$ sensor 18. TV is the ineffective time correction term.

Thus, a fuel amount corresponding to TNET(N)-×KO2+Be×TWP(N) is supplied to the combustion chamber by opening the fuel injection valve 6 over the time period Tout calculated by the equation (6).

Figure 3:
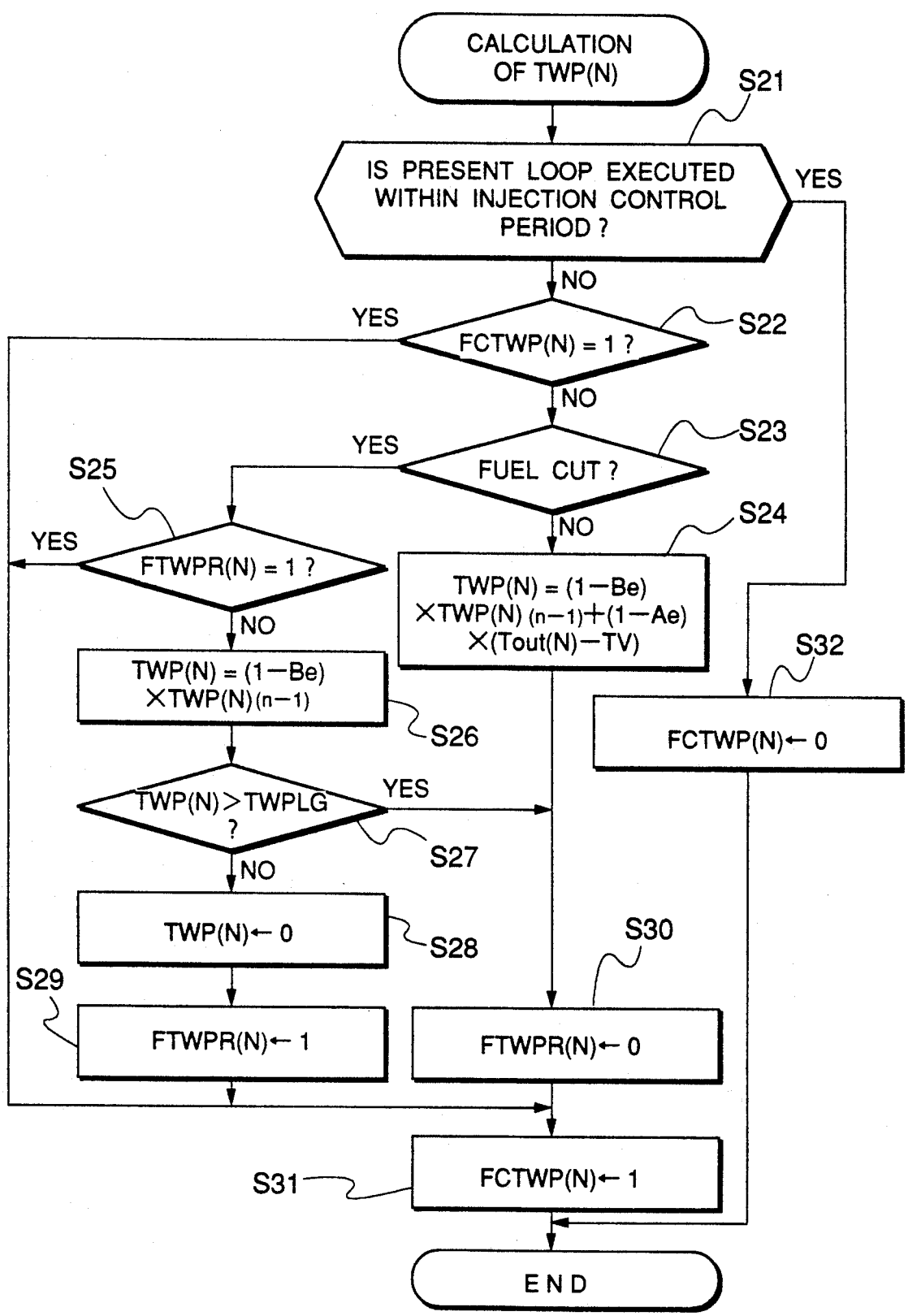
FIG. 3 is a flowchart of a program for calculating an intake pipe-adherent fuel amount TWP(N)

FIG. 3 shows the program for calculating the intake pipe-adherent fuel amount TWP(N), which is executed upon generation of each crank angle pulse which is generated whenever the crankshaft rotates through a predetermined angle (e.g. 30 degrees).

At a step S21, it is determined whether or not the present loop of execution of this program falls within a time period after the start of the calculation of the fuel injection amount Tout and before the fuel injection is completed (hereinafter referred to as the injection control period). If the answer is affirmative (YES), a first flag FCTWP(N) is set to a value of 0 at a step S32, followed by terminating the program. If the answer at the step S21 is negative (NO), i.e., if the present loop is not within the injection control period, it is determined at a step S22 whether or not the first flag FCTWP(N) is equal to 1. If the answer is affirmative (YES), that is, if FCTWP(N)=1, the program jumps to a step S31, whereas if the answer is negative (NO), i.e., if FCTWP(N)=0, it is determined at a step S23 whether or not the engine is under fuel cut (the fuel supply is interrupted).

If the engine is not under fuel cut, the intake pipe-adherent fuel amount TWP(N) is calculated at a step S24 by the use of the following equation (7), then a second flag FTWPR(N) is set to a value of 0, and the first flag FCTWP(N) is set to a value of 1 at steps S30 and S31, followed by terminating the program:

$$TWP(N) = (1 - Be) \times TWP(N)(n-1) + (1 - Ae) \times (Tout(N) - TV) \quad (7)$$

where TWP(N) (n−1) represents a value of TWP(N) obtained on the last occasion, and Tout(N) an updated or new value of the fuel injection amount Tout which has been calculated by the program of FIG. 2. The first term on the right side corresponds to a fuel amount remaining on the inner surface of the intake pipe 2 without being carried into the combustion chamber, out of the fuel previously adhering to the inner surface of the intake pipe 2, and the second term on the right side corresponds to a fuel amount newly adhering to the inner surface of the intake pipe 2 out of newly injected fuel.

If the answer at the step S23 is affirmative (YES), i.e., if the engine is under fuel out, it is determined at a step S25 whether or not the second flag FTWPR(N) has been set to a value of 1. If the answer is affirmative (YES), i.e., if FTWPR(N)=1, the program jumps to the step S31. If the answer is negative (NO), i.e., if FTWPR(N)=0, the adherent fuel amount TWP(N) is calculated by the use of the following equation (8) at a step S26, and then the program proceeds to a step S27:

$$TWP(N) = (1 - Be) \times TWP(N)(n-1) \quad (8)$$

The equation (8) is identical with the equation (1), except that the second term on the right side is omitted. The reason for the omission is that is no fuel newly adhering to the intake pipe inner surface, due to fuel cut.

At the step 27, it is determined whether or not the calculated TWP(N) value is larger than a very small predetermined value TWPLG. If the answer is affirmative (YES), i.e., if TWP(N)>TWPLG, the program proceeds to the next step S30. If the answer at the step S27 is negative (NO), i.e., if TWP(N)≦TWPLG, the TWP(N) value is set to a value of 0 at a step S28, and then the second flag FTWPR(N) is set to a value of 1 at a step S29, followed by the program proceeding to the step, at a step S31.

According to the program of FIG. 3 described above, the intake pipe-adherent fuel amount TWP(N) can be accurately calculated. Moreover, an appropriate fuel amount can be supplied to the combustion chamber of each cylinder, which reflects the fuel amount adhering to the inner surface of the intake pipe 2 as well as the fuel amount carried off the adherent amount.

Further, according to the embodiment the direct supply ratio A and the carry-off ratio B are corrected by the correction coefficients KA1, KB1, KA2 and KB2 which depend upon the amount of evaporative fuel supplied from the canister 23. Therefore, the calculated fuel injection amount reflects the evaporative fuel amount. As a result, the air-fuel ratio of the mixture supplied to the combustion chamber of each cylinder can be accurately controlled to a desired value.

Although in the present embodiment, the second correction coefficients KA2, KB2 for correcting the direct supply ratio A and the carry-off ratio B are set in accordance with the purging flow rate VP, they may be set in accordance with the valve opening of the purge control valve 25 or the duty ratio of the on-off control signal for the purge control valve 25.

According to the first embodiment described above, an amount of evaporative fuel supplied from the canister to the intake pipe is detected, and the intake pipe-adherent fuel amount and the carried-off fuel amount are corrected in response to the detected evaporative fuel amount. Therefore, the resulting calculated fuel injection amount can reflect the intake pipe-adherent fuel amount as well as the evaporative fuel amount, to thereby enable accurately controlling the air-fuel ratio of the mixture supplied to the combustion chamber of each cylinder to a desired value.

A second embodiment of the invention will be described in detail with reference to FIGS. 5 through 7.

According to the second embodiment, the intake pipe-adherent fuel amount and the carried-off fuel amount are corrected in response to the valve timing of intake valves and exhaust valves.

Figure 5:
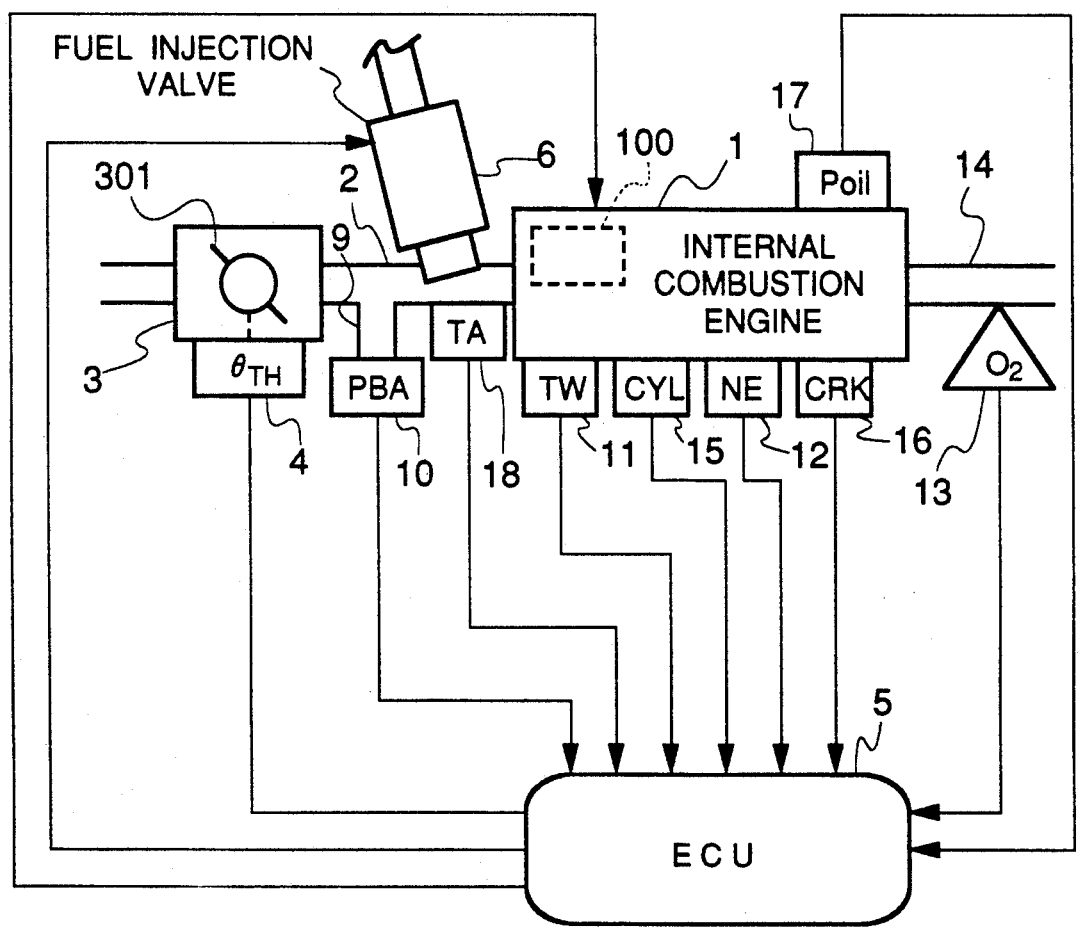
FIG. 5 is a block diagram showing the whole arrangement of a fuel supply control system for an internal combustion engine, according to a second embodiment of the invention.

FIG. 5 shows the whole arrangement of a fuel supply control system for an internal combustion engine, according to the second embodiment. In FIG. 5, elements and parts corresponding to those in FIG. 1 are designated by identical reference numerals, and description of which is omitted. In the figure, reference numeral 1 designates a DOHC straight-type four-cylinder internal combustion engine (hereinafter, referred to merely as "the engine") having a pair of intake valves and a pair of exhaust valves provided for each cylinder, none of which are shown. The engine 1 is provided with a valve timing changeover mechanism 100, which is capable of changing the valve timing of the intake valves and the exhaust valves between a high-speed valve timing (high speed V/T) suitable for engine operation in a higher engine rotational speed region and a low-speed valve timing (low speed V/T) suitable for engine operation in a lower engine rotational speed region. The term "valve timing" used in this specification includes the valve opening timing and/or valve closing timing, as well as the valve lift.

An intake air temperature (TA) sensor 18 is mounted in the inner wall of the intake pipe 2 at a location downstream of the conduit 9 connected to the PBA sensor 10 for supplying an electric signal indicative of the sensed intake air temperature to the ECU 5.

A cylinder-discriminating (CYL) sensor 15 and a crank angle (CRK) sensor 16 are arranged in facing relation to a camshaft or a crankshaft, neither of which is shown, of the engine 1 at respective predetermined locations thereof. The CYL sensor 15 generates a pulse signal (hereinafter referred to as "CYL signal pulse") at predetermined crank angles of a particular cylinder whenever the crankshaft rotates two rotations or through 720 degrees and supplies the CYL signal pulse to the ECU 5.

The CRK sensor 16 generates a pulse signal (hereinafter referred to as "CRK signal pulse") whenever the crankshaft rotates through a predetermined crank angle (e.g. 45°) and supplies the CRK signal pulse to the ECU 5.

The output signal pulses from the CYL sensor 15 and CRK sensor 16 are used together with the output signal from the NE sensor 12, for control of the timing of execution of fuel injection timing control, ignition timing control, etc., as well as detection of the engine rotational speed NE.

The valve timing changeover mechanism 100 has a solenoid valve, not shown, for changing the valve timing and is electrically connected to the ECU 5 to have its opening and closing operation controlled by a signal from the ECU 5. The solenoid valve changes operating oil pressure for the valve timing changeover mechanism 100 from a high level to a low level or vice versa, so that the valve timing is changed over from high speed V/T to low speed V/T or vice versa. The oil pressure in the changeover mechanism 100 is detected by an oil pressure (Poil) senor 17, and the sensed signal is supplied to the ECU 5.

The output circuit of the ECU 5 is adapted to supply driving signals to the fuel injection valves 6 and the solenoid valve of the valve timing changeover mechanism 100.

Figure 6:
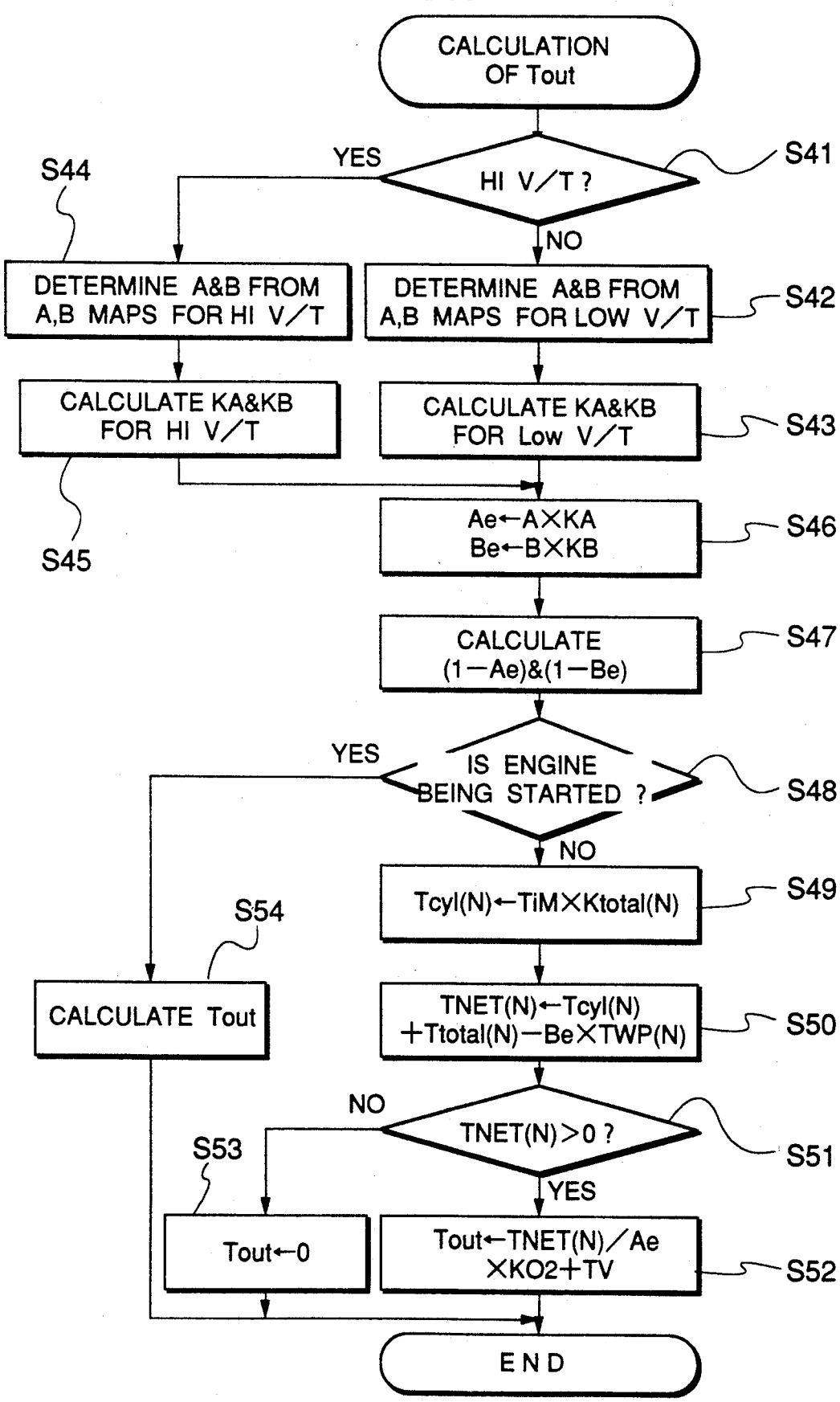
FIG. 6 is a flowchart of a program for calculating the fuel injection period Tout, according to the second embodiment.
Figure 7A:
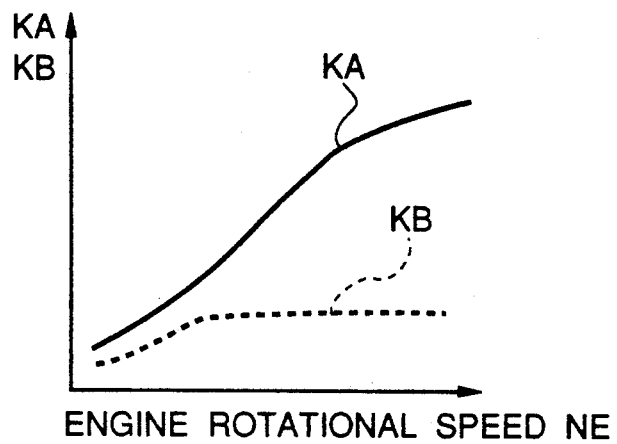
FIGS. 7(a) and (b) show tables for calculating correction coefficients for correcting the direct supply ratio A and the carry-off ratio B, according to the second embodiment.
Figure 7B:
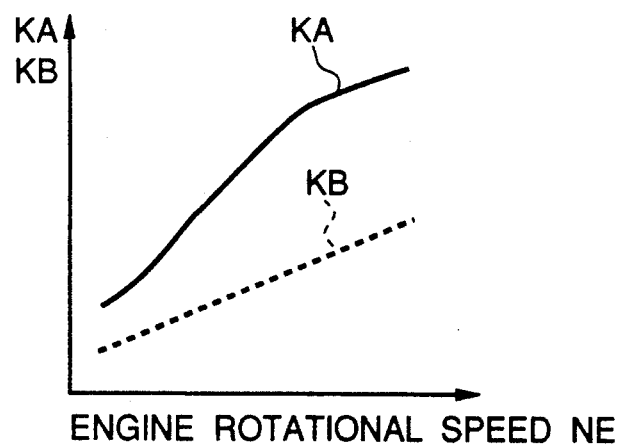

FIG. 6 shows a program for calculating the valve opening period of the fuel injection valves 6, i.e., the fuel injection amount Tout. This program is executed upon generation of each TDC signal pulse and in synchronism therewith.

At a step S41, it is determined whether or not the high speed V/T is selected. If the answer is negative (NO), i.e., if the low speed V/T is selected, a direct supply ratio A and a carry-off ratio B for the low speed V/T are calculated at a step S42.

Values of the direct supply ratio A and the carry-off ratio B are read from an A map and a B map for the low speed V/T, which are set in accordance with the coolant temperature TW and the intake pipe absolute pressure PBA, in response to detected TW and PBA values. The direct supply ratio A and the carry-off ratio B for the low speed may be calculated by interpolation, if required.

At the next step S43, correction coefficients KA and KB for correcting the direct supply ratio A and the carry-off ratio B for the low speed V/T are calculated. Values of the correction coefficient KA and KB are read from a KA table and a KB table for the low speed V/T, shown in FIG. 7(a), in response to the engine rotational speed NE. In the KA and KB tables, the correction coefficient KA for the direct supply ratio A and the correction coefficient KB for the carry-off ratio B are set such that they increase as the engine rotational speed NE increases, for the reason mentioned before.

If the answer at the step S41 is affirmative (YES), similarly to the steps S42 and S43, a direct supply ratio A, and a carry-off ratio B and correction coefficients KA, KB for the high speed V/T are calculated at steps S44 and S45, followed by the program proceeding to a step S46. At the step S44, values of the direct supply ratio A and the carry-off ratio B for the high speed V/T are read from an A map and a B map for the high speed V/T, and at the step S45, the correction coefficients KA, KB for the high speed V/T are calculated by the use of a KA table and a KB table for the high speed V/T, shown in FIG. 7(b).

As mentioned above, according to the present embodiment, two kinds of A maps and B maps as well as two kinds of correction coefficients KA and KB are provided, respectively, for the high speed V/T and low speed V/T. The reason for this is that the air flow speed in the vicinity of the intake valve and variation of pressure within the intake pipe 2 resulting from the variation, which are factors of fuel transportation parameters, differ depending upon the valve opening and/or closing timing and valve lift of the intake valve. Accordingly, the direct supply ratio A and the carry-off ratio B both vary depending on the valve timing of the intake valve. Therefore, the A map, B map, KA table and KB table have been set with the above-mentioned fact taken into account.

At a step S46 following the step S43 or S55, a corrected direct supply ratio Ae and a corrected carry-off ratio Be are calculated by the use of the following equations (9) and (10), followed by calculating (1−Ae) and (1−Be) at a step S47, and then the program proceeds to a step S48:

$$Ae = A \times KA \quad (9)$$

$$Be = B \times KB \quad (10)$$

The values Ae, (1−Ae) and (1−Be) are stored into the RAM within the ECU 5 for use in executing the program in FIG. 3, described hereinbefore.

Following the step S47, steps S48–S54 are executed in the same manner as the steps S5, S6, S8–S12 in FIG. 2, except that the step S7 in FIG. 2 is omitted.

The intake pipe-adherent fuel amount TWP(N) is calculated by the same program as one shown in FIG. 3, and therefore description thereof is omitted.

According to the second embodiment described above, the direct supply ratio A and the carry-off ratio B are calculated and corrected in response to valve timing selected, whereby it is possible to accurately estimate the intake pipe-adherent fuel amount, irrespective of valve timing selected and hence control the air-fuel ratio of a mixture supplied to the combustion chamber to a desired value.

Figure 8:
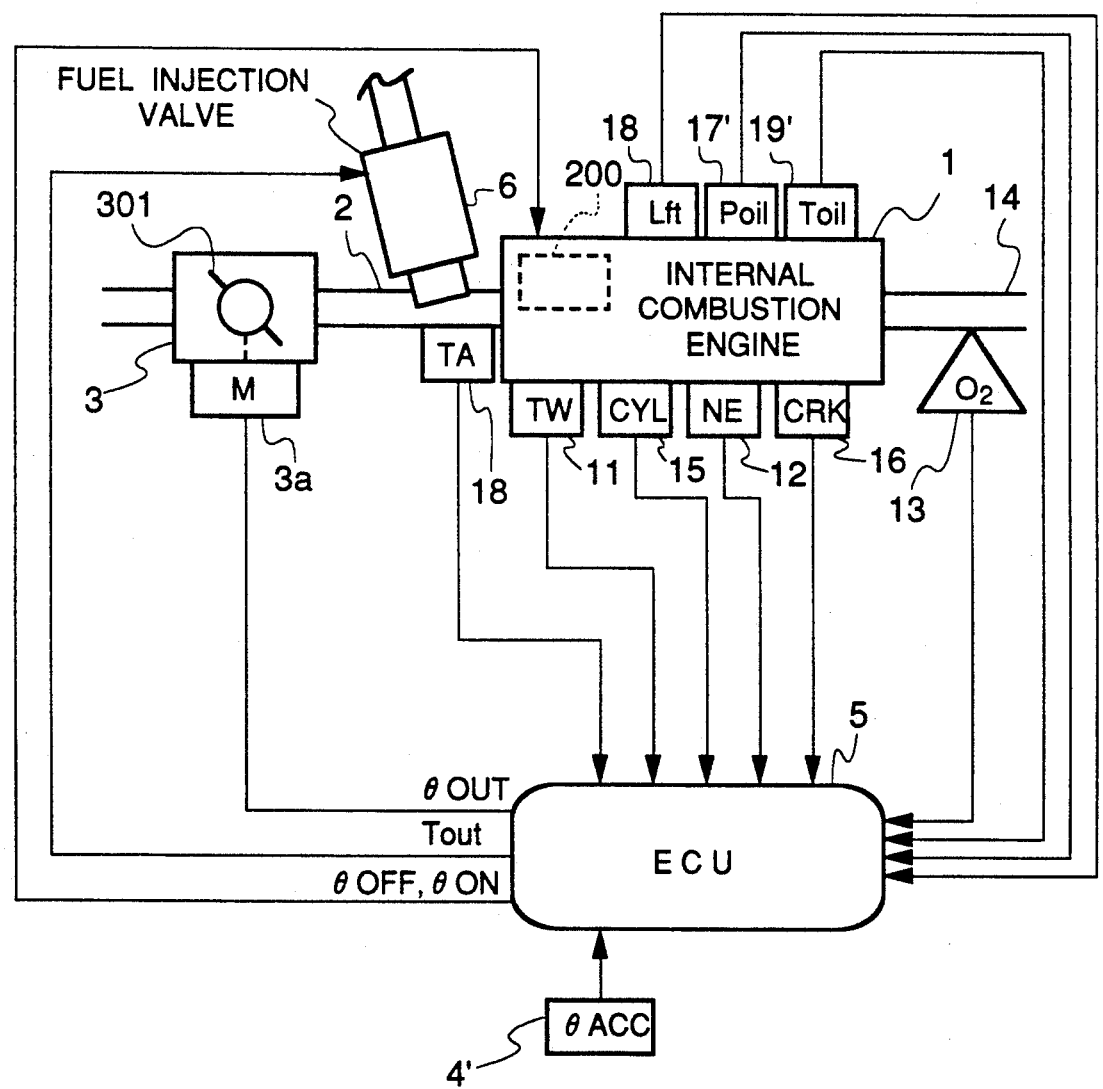
FIG. 8 is a block diagram showing the whole arrangement of a fuel supply control system for an internal combustion engine, according to a third embodiment of the invention.

FIG. 8 shows the whole arrangement of a fuel supply control system for an internal combustion engine, according to a third embodiment of the invention. As shown in the figure, according to this embodiment, the engine 1 is provided with an oil hydraulic driving valve unit 200 for each cylinder, in place of the valve timing changeover mechanism 100 employed in the arrangement of FIG. 1. The ECU 5 is connected to a solenoid of the oil hydraulic driving valve unit 200, and supplies control signals ($\theta$OFF and $\theta$ON) thereto.

A motor 3a is coupled to the throttle valve 301 for driving it in response to a control signal from the ECU 5 so as to control its valve opening. The throttle valve 301 is held at almost the maximum opening when the engine 1 is operating in normal operating conditions. With the throttle valve 301 thus held at almost the maximum opening, the valve opening period of the intake valve is changed by the oil hydraulic driving unit 200 to control an intake air amount supplied to the cylinder of the engine 1.

Connected to the ECU 5 is an oil pressure sensor 17' which detects the pressure (Poil) of operating oil in the hydraulic driving valve unit 200, in place of the oil pressure sensor 17 in the second embodiment. Further connected to the ECU 5 are an oil temperature sensor 19 which senses the oil temperature Toil of the operating oil, a lift sensor 18 which senses the lift of the intake valve, and an accelerator pedal opening sensor which senses a stepping amount ($\theta$ACC) of an accelerator pedal, not shown, of a vehicle on which the engine is installed. Output signals from these sensors are supplied to the ECU 5.

Elements and parts other than those mentioned above are identical in construction and arrangement with those employed in the second embodiment of FIG. 5 and designated by identical reference numerals, and description thereof is omitted.

Figure 9:
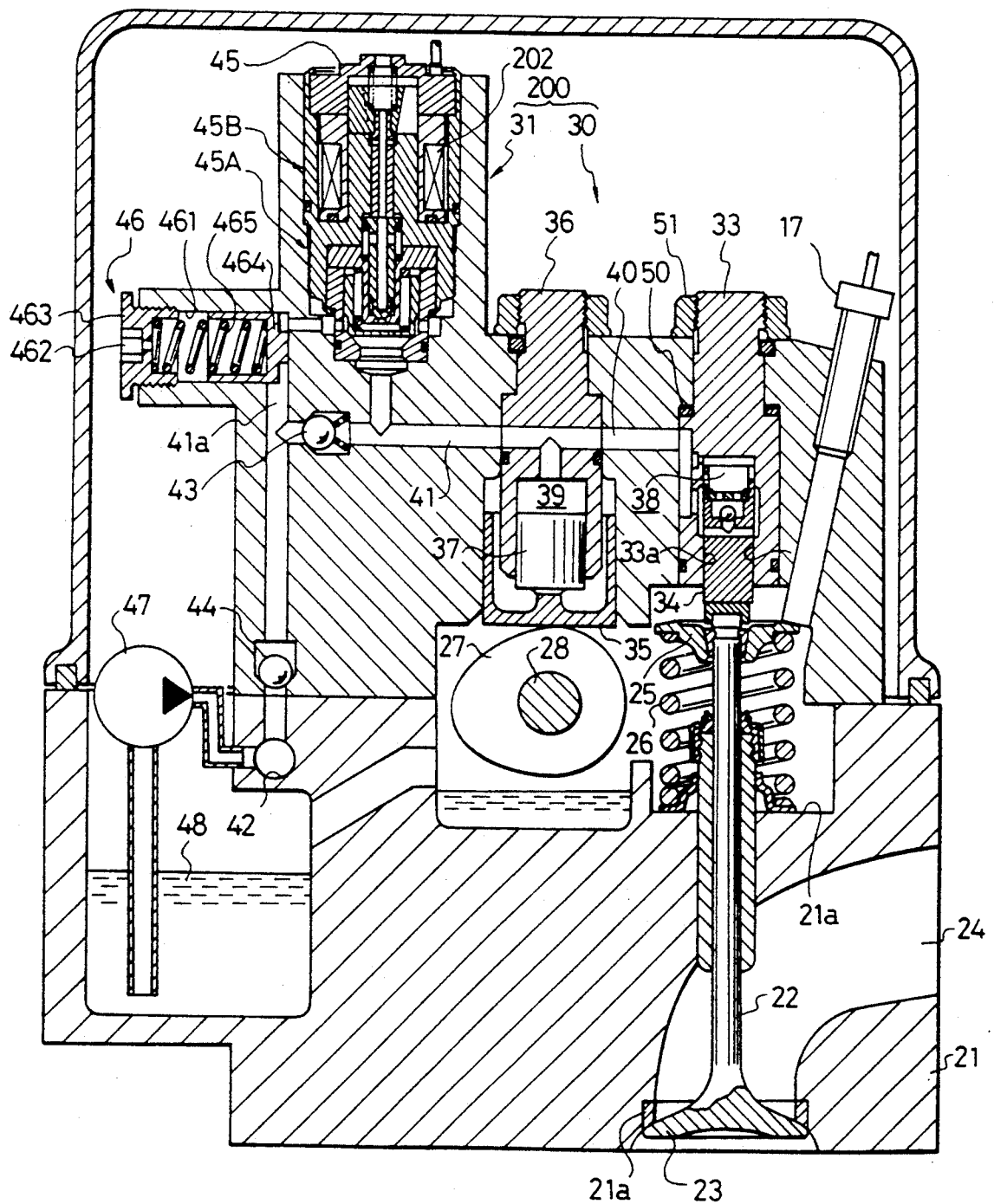
FIG. 9 is a cross-sectional view of an oil hydraulic valve driving unit provided in an engine in FIG. 8.

FIG. 9 shows the internal construction of the oil hydraulic driving valve unit 200 which is provided in each cylinder head 21 of the engine 1. The cylinder head 21 is formed therein with an intake valve port 23, one end of which opens into an upper space within a combustion chamber, not shown, of the engine 1 and the other end is in communication with an intake port 24. An intake valve 22 is slidably mounted in the cylinder head 21 arranged for vertical reciprocating motion as viewed in the figure to close and open the intake valve port 23. A valve spring 26 is tautly mounted between a collar 25 of the intake valve 22 and a spring seat 21a in the cylinder head 21 and urges the intake valve 22 upward as viewed in the figure or in a valve closing direction.

On the other hand, a camshaft 28 having a cam 27 formed integrally thereon is rotatably mounted in the cylinder head 21 at a left side of the intake valve 22. The camshaft 28 is coupled to a crankshaft, not shown, via a timing belt, not shown. The oil hydraulic driving unit 200 is interposed between the intake valve 22 and the cam 27 formed on the camshaft 28.

The oil hydraulic driving valve unit 200 is comprised of an oil hydraulic driving mechanism 30 disposed to downwardly urge the intake valve 22 against the force of the valve spring 26 to close or open same in response to the profile of the cam 27, and an oil pressure release mechanism 31 disposed to cancel the urging force of the oil hydraulic driving mechanism 30 while the intake valve 22 is being opened to thereby close the intake valve 22 irrespective of the cam profile.

The oil hydraulic driving mechanism 30 is mainly comprised of a first cylinder body 33 secured to a block 32 formed integrally with the cylinder head 21, a valve-side piston (valve driving piston) 34 slidably fitted in a cylinder bore 33a in the first cylinder body 33, with a lower end thereof resting against an upper end of the intake valve 22, an oil pressure chamber 38 defined by the first cylinder body 33 and the valve-side piston 34, an operating oil pressure chamber 38 defined by the first cylinder body 33 and the valve-side piston 34, a second cylinder body 36 secured to the block 32, a lifter 35 disposed in sliding contact with the cam 27, a cam-side piston 37 slidably fitted in a lower portion of the second cylinder body 36, with a lower end thereof resting against a bottom surface of the lifter 35, an oil hydraulic pressure creating chamber 39 defined by the second cylinder body 36 and the cam-side piston 37, and an oil passage 40 extending between the oil hydraulic pressure creating chamber 39 and the operating oil pressure chamber 38. The oil hydraulic driving mechanism 30 thus constructed operates according to the profile of the cam 27 to selectively open or close the intake valve 22 when the oil pressure in the operating oil pressure chamber 38 is above a predetermined value.

The lift sensor 18 is arranged in the block 32 at a location opposite the collar 25 of the intake valve 22 to sense its lift. The lift sensor 17 is electrically connected to the ECU 5 to supply same with a signal indicative of the sensed lift.

On the other hand, the oil pressure release mechanism 31 is mainly comprised of an oil passage 41 connecting between the oil passage 41 and an oil supply gallery 42, a spill valve 45 disposed to allow oil pressure to escape from the oil passage 41, a feed valve 43 and a check valve 44 both arranged in the oil passage 41, and an accumulator 46 disposed to maintain oil pressure within an accumulator circuit 41a formed by the valves 43, 44 and the spill valve 45 at a predetermined value. The oil supply gallery 42 is connected to an oil pump 47 to supply oil pressure created by the oil pump 47 to the oil hydraulic driving valve units 200 of the engine cylinders. The oil pump 47 pressurizes operating oil in an auxiliary oil pan 48 provided in the cylinder head 21 and supplies the pressurized oil to the oil supply gallery 42. It may be so arranged that the oil supply gallery 42 is supplied with operating oil from an oil pan provided at a bottom portion of a crankcase, not shown.

The spill valve 45 is comprised of a control valve section 45A, and a solenoid driving section 45B for driving the control valve section 45A.

In the spill valve 45, when a solenoid 202 of the solenoid driving section 45B is deenergized, the spill valve 45 is open, whereas when the solenoid 202 is energized, the spill valve 45 is closed. The solenoid is electrically connected to the ECU 5 to be energized or deenergized by a control signal from the ECU 5.

The accumulator 46 is arranged in the accumulator circuit 41a to maintain oil pressure within the accumulator circuit 41a at a predetermined value. The accumulator 46 is comprised of a cylinder bore 461 formed in the block 32, a cap 463 having an air hole 462 formed therein, a piston 464 slidably fitted in the cylinder bore 461, and a spring 465 tautly interposed between the cap 463 and the piston 464.

The operation of the oil hydraulic driving mechanism 30 and the oil pressure release mechanism 31 constructed as above will now be described.

Figure 10:
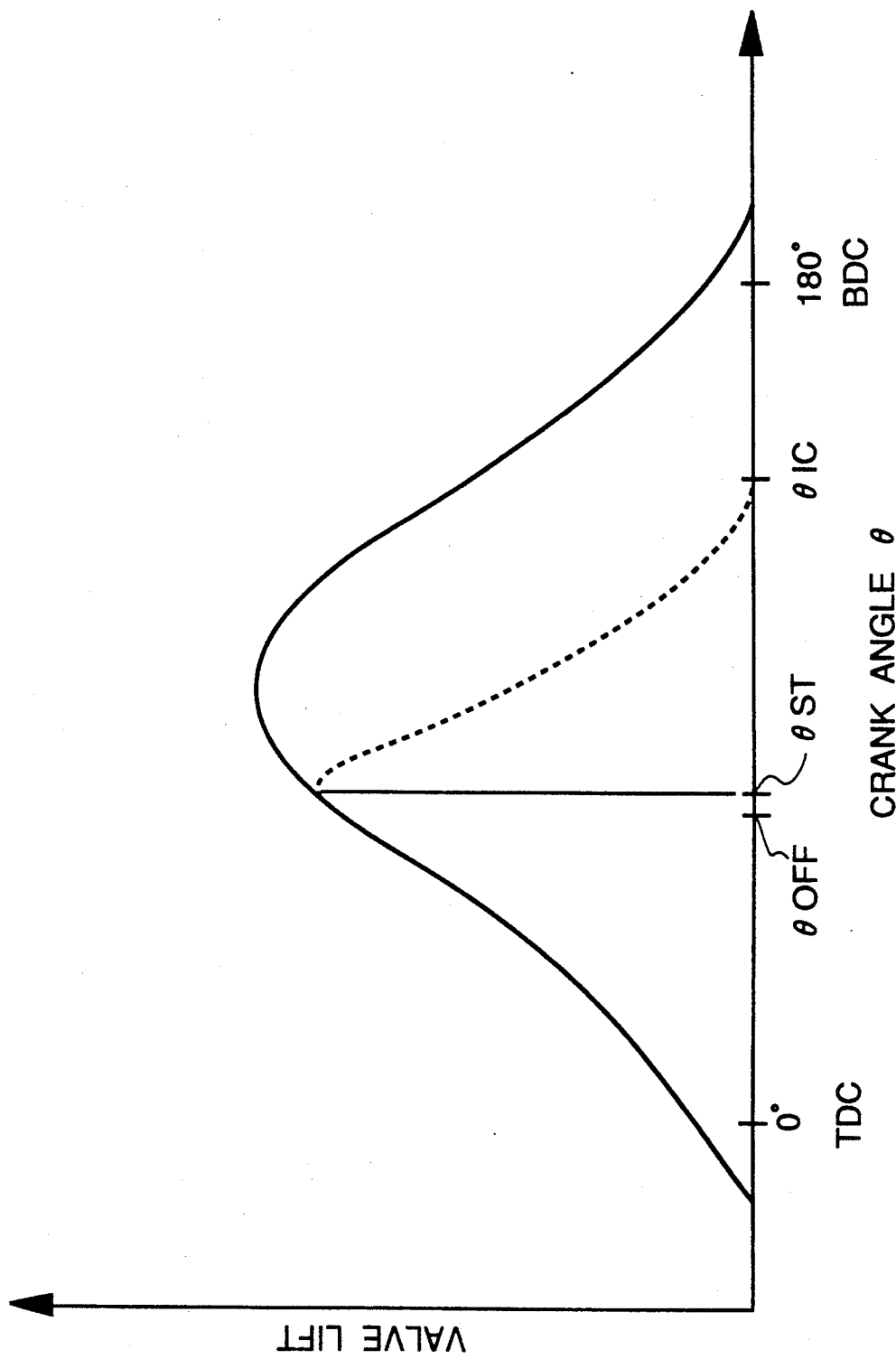
FIG. 10 is a graph useful in explaining operating characteristics (valve timing) of an intake valve in the engine in FIG. 8.

When the solenoid 202 of the spill valve 45 is energized by the control signal from the ECU 5, the spill valve 45 is closed so that the oil pressure within the oil pressure creating chamber 39, the oil passage 40 and the operating oil pressure chamber 38 of the oil hydraulic driving mechanism 30 is maintained at a high level (at a predetermined pressure value or more), whereby the intake valve 22 is alternately opened and closed in response to the profile of the cam 27. The valve operating characteristic (the relationship between the crank angle and the valve lift) in this case is shown, by way of example, by the solid line in FIG. 10.

On the other hand, when the solenoid 202 of the spill valve 45 is deenergized by the control signal from the ECU 5 while the intake valve is open, the spill valve 45 becomes open. As a result, the oil pressure within the operating oil pressure creating chamber 39, the oil passage 40 and the oil pressure chamber 38 decreases, whereby the intake valve 22 starts its closing motion, irrespective of the profile of the cam 27. Then, the valve operating characteristic is such as shown by the broken line in FIG. 10. That is, in the figure, when the solenoid 202 is deenergized at a crank angle $\theta$OFF, the intake valve 22 begins to make a closing motion at a crank angle $\theta$ST after a slight time delay from the crank angle $\theta$OFF and becomes completely closed at a crank angle $\theta$IC (hereinafter referred to as "the intake valve closing timing").

In this way, the intake valve 22 is controlled by the control signal from the ECU 5 such that it begins to make a closing motion when it is on the opening stroke, by rendering the oil hydraulic driving mechanism 30 inoperative. Therefore, the timing of valve closing start can be set to any desired timing, whereby it is possible to control the intake air amount supplied to the engine cylinders by the control signal from the ECU 5.

A similar oil hydraulic driving unit, now shown, is provided on the side of exhaust valves in this or third embodiment. Alternatively, there may be provided an ordinary type valve operating mechanism in which the exhaust valve is closed at a constant timing according to a cam profile, or a variable valve timing mechanism in which the valve opening/closing timing can be set to a plurality of different timings, similarly to the valve timing changeover mechanism employed in this embodiment. In the following description, the valve closing timing on the exhaust valve side will be referred to as "exhaust valve closing timing $\theta$EC", as corresponding to the intake valve timing $\theta$IC on the intake valve side.

Figure 11:
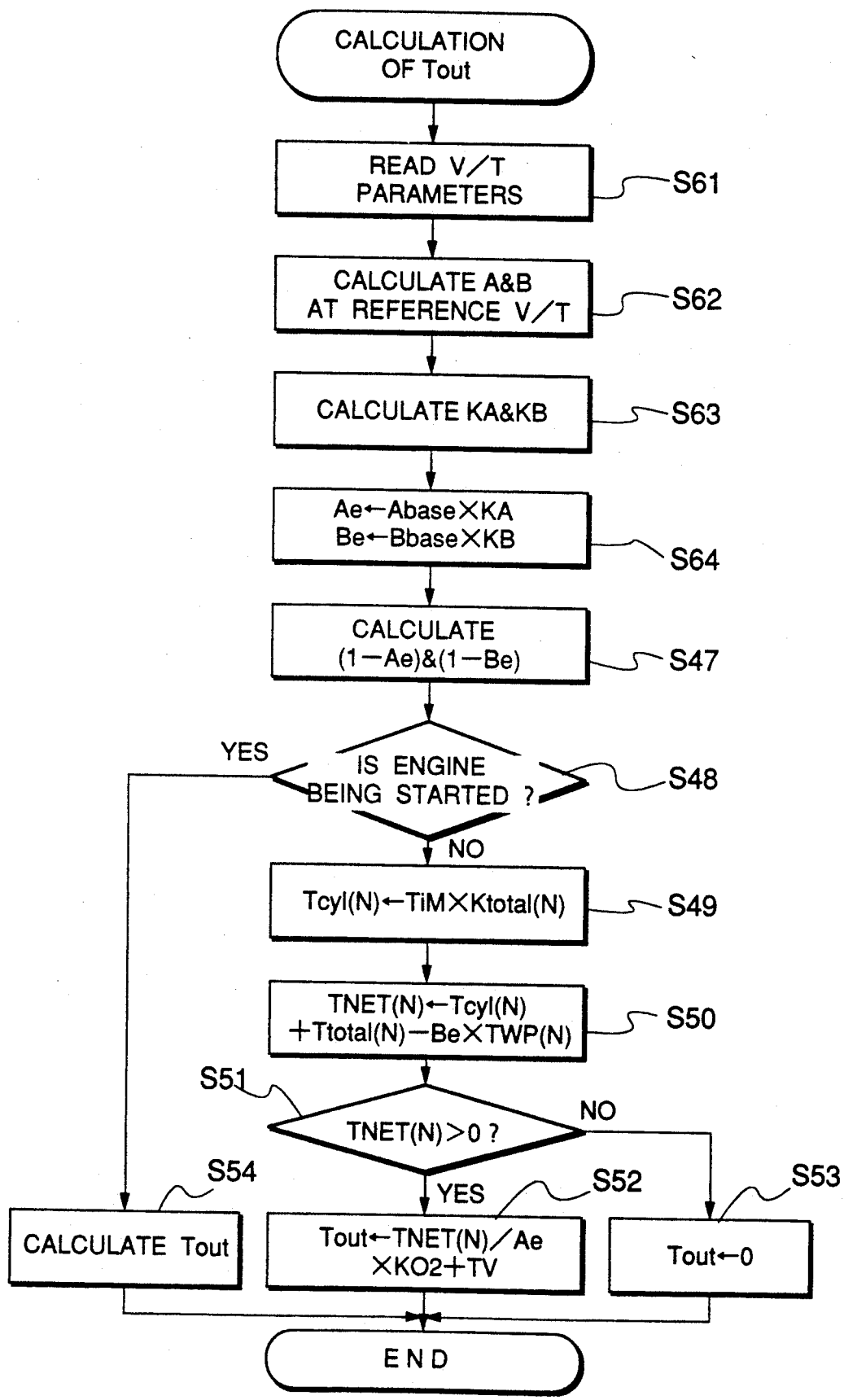
FIG. 11 is a flowchart of a program for calculating the fuel injection period Tout, according to the third embodiment.

FIG. 11 shows a program for calculating the fuel injection amount Tout according to the third embodiment, which program corresponds to the one shown in FIG. 6.

At a step S61, valve timing parameters, i.e., intake valve closing timing $\theta$IC and exhaust valve closing timing $\theta$EC are read.

Figure 12A:
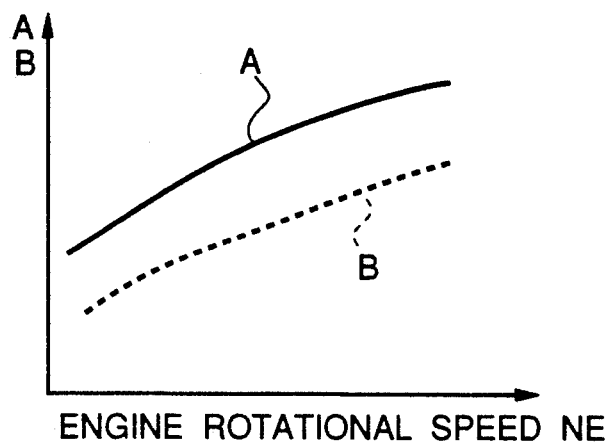
FIGS. 12(a) and (b) show tables for use in calculating the direct supply ratio A and the carry-off ratio B.
Figure 12B:
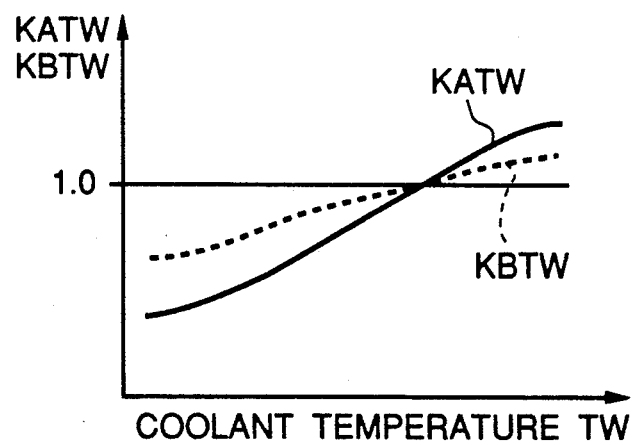

At a step S62, the direct supply ratio A and the carry-off ratio B are calculated by the use of an A table and a B table shown in FIG. 12(a) in response to the detected engine rotational speed Ne. Then, coolant temperature correction coefficients KATW and KBTW are calculated in response to the detected engine coolant temperature by the use of a KATW table and a KBTW table set in accordance with the engine coolant temperature TW as shown in FIG. 12(b). The values of the A and B tables shown in FIG. 12(a) are set to values to be obtained when the engine output assumes 50% of its maximum value at each value of the engine rotational speed. At the step S62, reference values Abase and Bbase of the direct supply ratio and the carry-off ratio are also calculated by the use of the following equations (11) and (12):

$$Abase = A \times KATW \quad (11)$$

$$Bbase = B \times KBTW \quad (12)$$

Figure 13A:
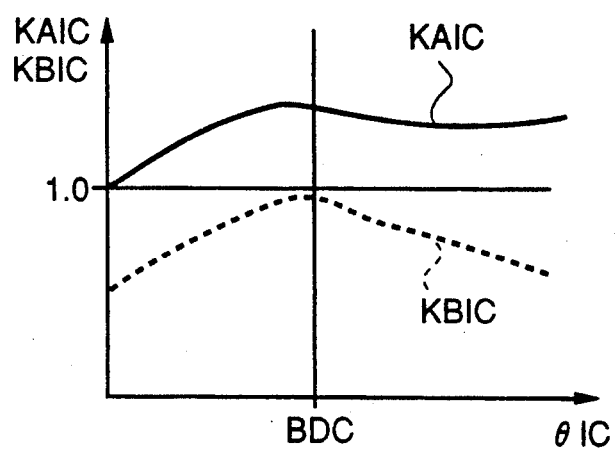
FIGS. 13(a) and (b) show tables for calculating correction coefficients dependent upon the direct supply ratio A and the carry-off ratio B.
Figure 13B:
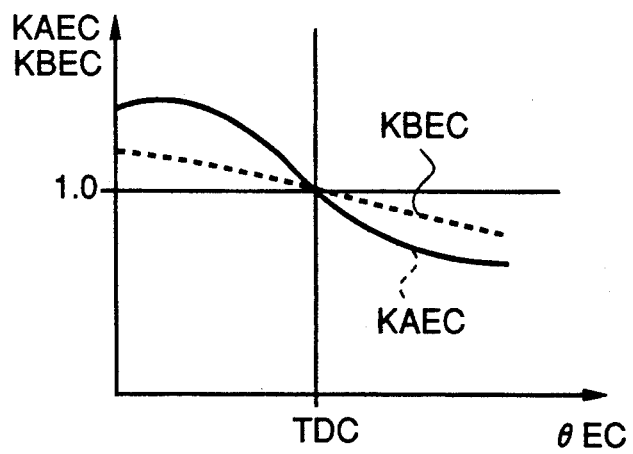

At a step S63, intake side correction coefficients KAIC and KBIC for the direct supply ratio and the carry-off ratio are calculated by the use of a KAIC table and a KBIC table set in accordance with the closing timing $\theta$IC of the intake valve, as shown in FIG. 13(a), then, exhaust-side correction coefficients KAEC and KBEC are calculated by the use of a KAEC table and a KBEC table set in accordance with the closing timing $\theta$EC of the exhaust valve, as shown in FIG. 13(b), followed by calculating reference value correction coefficients KA and KB by the use of the following equations (13) and (14). In this embodiment, as the $\theta$IC value or $\theta$EC value increases in FIG. 13 (the $\theta$IC value moves leftward in FIG. 13, for instance), the valve opening period of the intake valve or the exhaust valve decreases:

$$KA = KAIC \times KAEC \tag{13}$$

$$KB = KBIC \times KBEC \tag{14}$$

At the next step S64, a corrected direct supply ratio Ae and a corrected carry-off ratio Be are calculated by the use of the following equations (15) and (16), and then the programs proceeds to a step S47:

$$Ae = Abase \times KA \tag{15}$$

$$Be = Bbase \times KB \tag{16}$$

The steps S47-S54 in FIG. 11 are identical with the steps S47-S54 in FIG. 6, description of which is therefore omitted.

The intake pipe-adherent fuel amount TWP(N) is calculated by the aforedescribed program in FIG. 3, also in this embodiment.

According to the present embodiment, the direct supply ratio A and the carry-off ratio B are corrected in response to the closing timing of the intake and exhaust valves. Therefore, it is possible to accurately estimate the intake pipe-adherent fuel amount and the carried-off fuel amount, irrespective of the closing timing of the intake and exhaust valves and hence accurately control the air-fuel ratio of a mixture supplied to the combustion chambers.

The method of calculating the direct supply ratio A and the carry-off ratio B employed in the second and third embodiments described above is appliable to a valve control system in which part of the intake valves and/or part of the exhaust valves are rendered inoperative when the engine is operating in a low load condition.

In this way, according to the third embodiment described above, estimated values of the intake pipe-adherent fuel amount and the carried-off fuel amount are corrected in dependence on the valve operating characteristics of the intake valves and/or the exhaust valves, to thereby enable to accurately estimate the intake pipe-adherent fuel amount, irrespective of the valve operating characteristics and hence accurately control the air-fuel ratio of a mixture supplied to the combustion chambers.

Next, a fourth embodiment of the invention will be described in detail with referrence to FIGS. 14-18.

Figure 14:
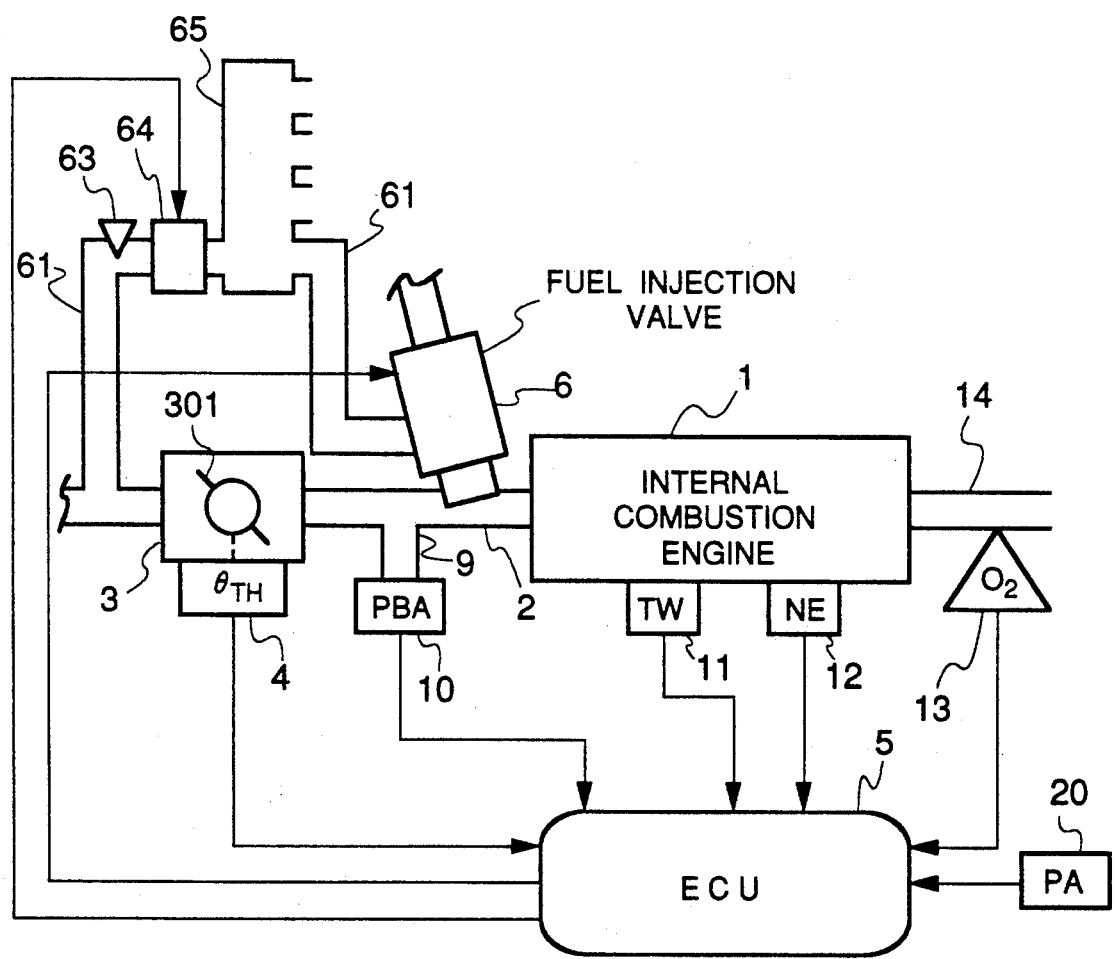
FIG. 14 is a block diagram showing the whole arrangement of a fuel supply control system for an internal combustion engine, according to a fourth embodiment of the invention.

Referring first to FIG. 14, there is illustrated the whole arrangement of a fuel supply control system for an internal combustion engine according to the fourth embodiment. In FIG. 14, elements and parts corresponding to those in FIG. 1 are designated by identical reference numerals, description of which is omitted.

Each fuel injection valve 6 is provided with a heater for heating injected fuel and an air chamber forming part of an assist air supply system (auxiliary air supply means), none of them being shown. The air chamber is connected to the interior of the intake pipe 2 at a location upstream of the throttle valve 301 via an assist air passage 61.

Arranged across the assist air passage 61 are an idling adjusting screw 63, an assist air amount control valve 64, and an air heater 65 which are commonly provided for all the engine cylinders. The assist air amount control valve 64 is formed by a solenoid valve, the valve opening of which can be linearly varied and which is electrically connected to the ECU 5 to be controlled by a control signal from the ECU 5.

An atmospheric pressure sensor 20 is connected to the ECU 5 to supply same with a signal indicative of the sensed atmospheric pressure.

The CPU of the ECU 5 is adapted to execute a control program for controlling the injection valve 6 and the assist air amount control valve 64, the memory means stores maps and tables, referred to hereinafter, and the output circuit is adapted to supply driving signals to the fuel injection valves 6, the assist air amount control valve 64, etc.

Figure 15:
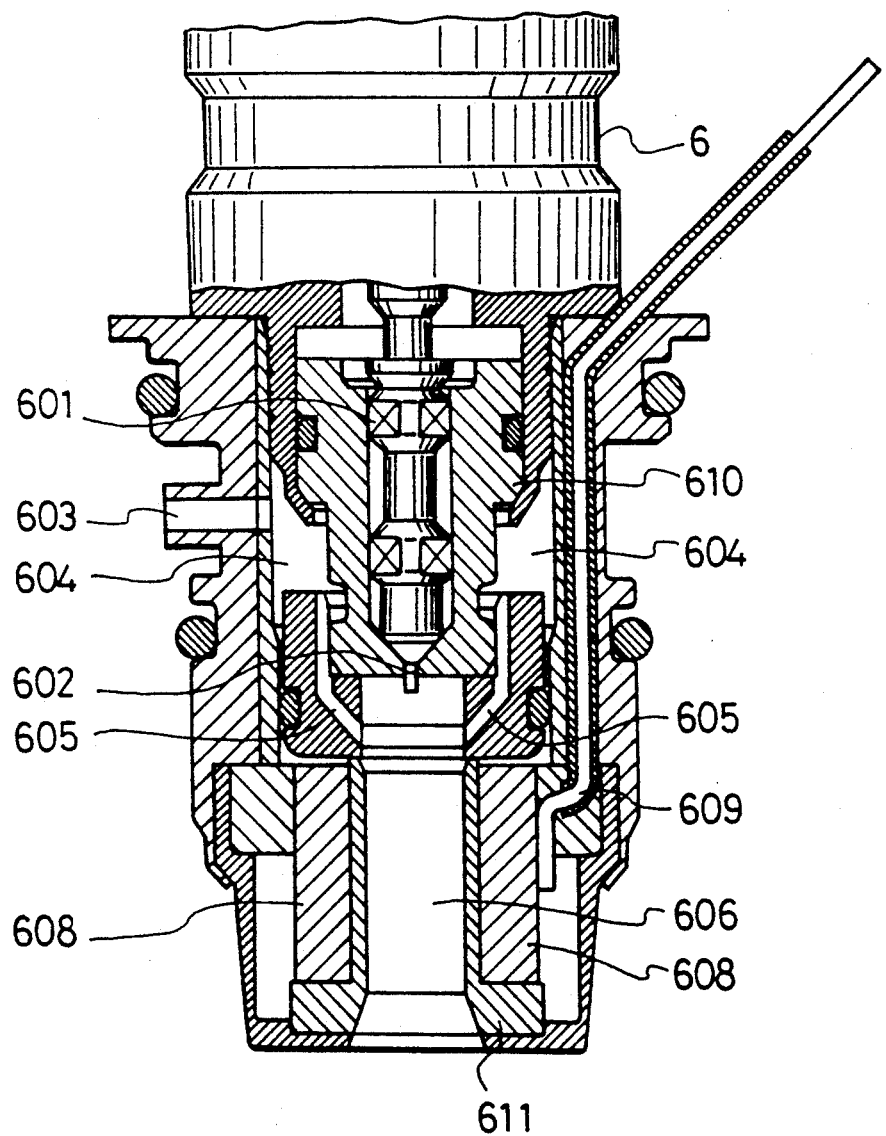
FIG. 15 is a cross-sectional view of essential parts of a fuel injection valve provided in the system of FIG. 14.

FIG. 15 shows the internal construction of the fuel injection valve 6. In the figure, reference numeral 601 designates a valve element which is axially slidably fitted in a valve housing 610. When the valve element 601 moves upward as viewed in the figure, the injection valve 6 opens so that fuel is injected into a passage 606 through a nozzle 602. The passage 606 opens into the intake pipe 2.

An air chamber 604 is defined around the valve housing 610 and is communicated with the assist air passage 61 via an inlet port 603.

The air chamber 604 is also communicated with two assist air injection holes 605 and 606 through which assist air is supplied to a zone in the vicinity of the nozzle 602.

Provided around the passage 606 is a heater 608 formed, e.g., by a ceramic heater, and is electrically connected to the ECU 5 by means of a power supply wire 609. The heater 608 is supported on a heater collar 611. Electric power PH supplied to the heater 608, i.e., heating calory by the heater 608 is controlled so as to increase as the engine coolant temperature TW is lower. The heater 608 serves to promote atomization of injected fuel even when the engine temperature is low.

Figure 16:
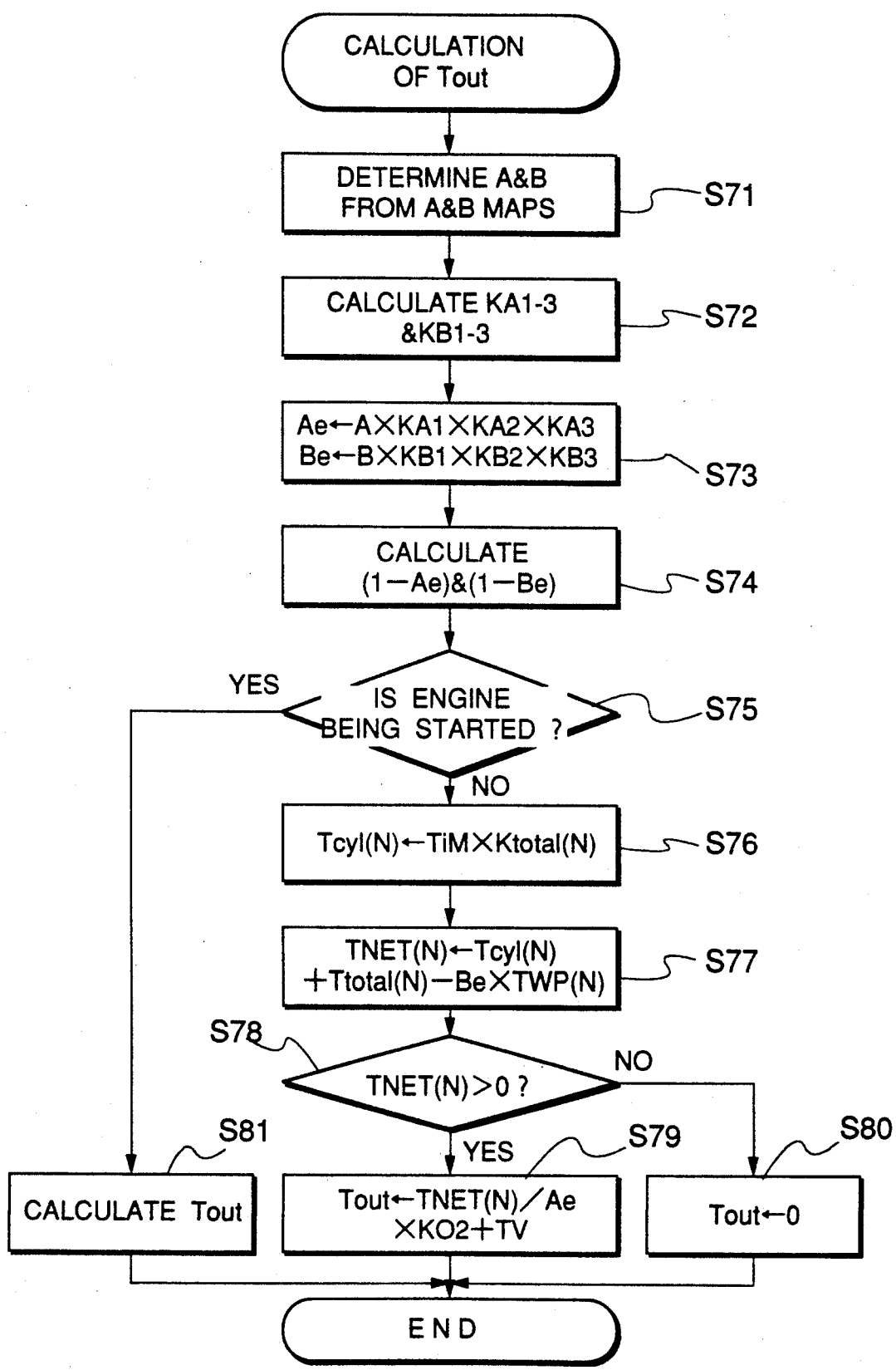
FIG. 16 is a flowchart of a program for calculating the fuel injection period Tout, according to the fourth embodiment.

FIG. 16 shows a program for calculating the fuel injection amount Tout. This program is executed upon generation of each TDC signal pulse and in synchronism therewith.

The manner of calculating fuel injection amount Tout according to this embodiment is almost identical with the one shown in FIG. 2 except that the step S2 in FIG. 2 is omitted in FIG. 16.

Figure 17A:
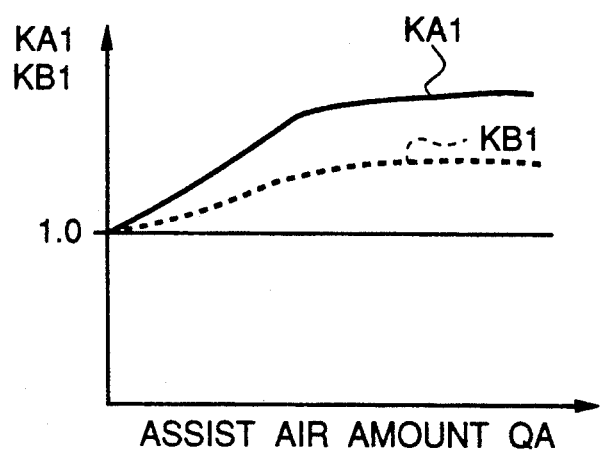
FIGS. 17(a) and (b) show tables for calculating correction coefficients for correcting the direct supply ratio A and the carry-off ratio B.

The following description only refers to those which are peculiar to this embodiment:

At the step 62, the first correction coefficients KA1 and KB1 out of the correction coefficients KA1-3 and KB1-3 for the direct supply ratio A and the carry-off ratio B are deterimined based upon the assist air amount $\theta A$, as shown in FIG. 17(a). The assist air amount $\theta A$ can be calculated from the atmospheric pressure PA and the intake pipe absolute pressure PBA, since the opening area of the assist air injection holes 605 of the fuel injection valve 6 is always constant. Alternatively, the assist air amount $\theta A$ may be obtained by first directing the valve opening of the assist air amount control valve 24, and then calculating the assist air amount $\theta A$ from the detected valve opening and the engine rotational speed NE and the intake pipe absolute pressure PBA or from a valve opening command value for the control valve 24 and the NE and PBA values.

Figure 17B:
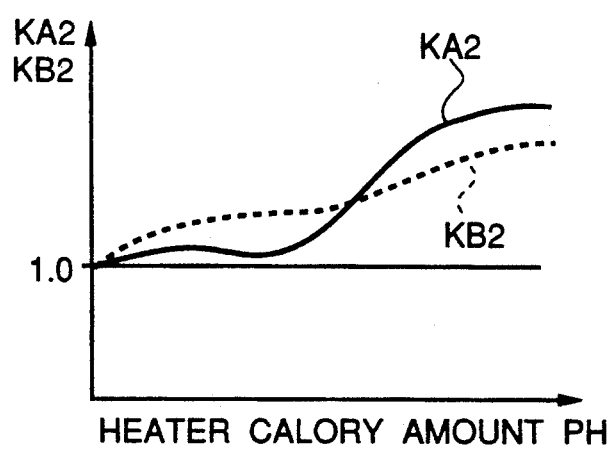
Figure 18:
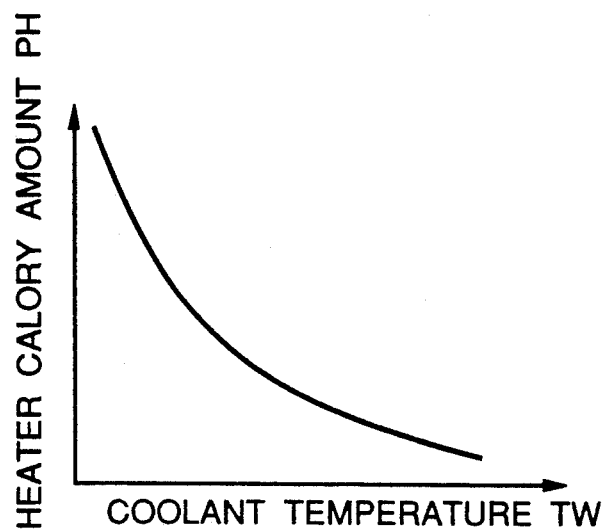
FIG. 18 is a graph showing the relationship between engine coolant temperature TW and heater supply power PH.

The second correction coefficients KA2 and KB2 are determined from the electric power PH supplied to the heater 608 of the fuel injection valve 6, as shown in FIG. 17(b).

The reason for increasing the first correction coefficients KA1 and KB1 as the assist air amount $\theta A$ increases is that when the assist air amount $\theta A$ supplied to the fuel injection valve 6 increases, the direct supply ratio A and the carry-off ratio B apparently increase correspondingly. Also the second correction coefficients KA2 and KB2 are similarly set as shown in FIG. 17(b).

The intake pipe-adherent fuel amount TWP(N) is calculated in a manner identical with the program in FIG. 3 described hereinbefore.

According to the fourth embodiment described above, the direct supply ratio A and the carry-off ratio B are corrected by the first correction coefficients KA1 and KB1, which are determined in response to the assist air amount, and the second correction coefficients KA2 and KB2, which are determined in response to the electric power supplied to the heater 608. Thus, the fuel injection amount can be calculated with the assist air supply and/or heating by the heater taken into account. As a result, it is possible to accurately control the air-fuel ratio of a mixture supplied to the combustion chamber to a desired valve.

Figure 19:
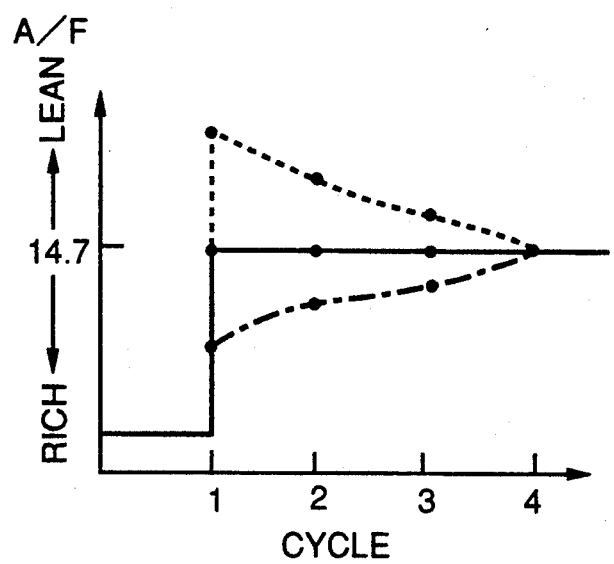
FIG. 19 is a graph showing transient characteristics of the air-fuel ratio A/F.

This will be further explained with reference to FIG. 19. Let it be assumed that, as shown in the figure, the air-fuel ratio is controlled to a value of 14.7 as a desired value from an initial condition in which the air-fuel ratio is on the rich side with respect to 14.7. Unless the direct supply ratio A and the carry-off ratio B are corrected in response to the assist air amount, the transient response is such as shown by the broken line in FIG. 19 in the case where the assist air amount is small, whereas it is such as shown by the chain line in the case where the assist air amount is large. In contrast, according to the embodiment, an excellent transient response can be obtained, as shown by the solid line.

Figure 20:
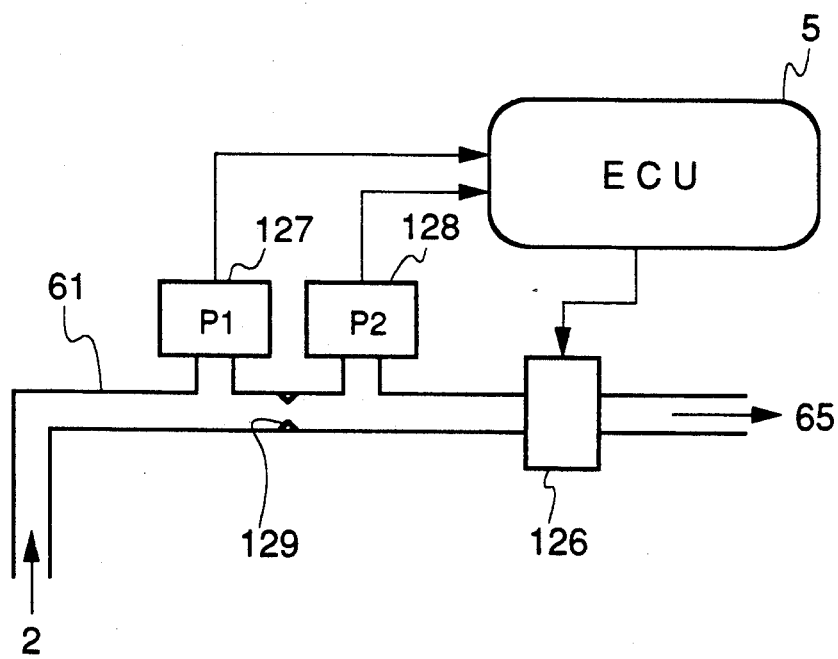
FIG. 20 is a block diagram showing a variation of an assist-air supply system employed in the fourth embodiment.

FIG. 20 shows the whole arrangement of another example of the assist air supply system applicable to the invention. The other elements and parts than those shown in the figure are identical with those in FIG. 14.

In FIG. 20, a restriction 129 is provided in the assist air passage 61, and pressure sensors 127 and 128 are arranged in communication with the assist air passage 61 at opposite sides of the restriction 129. The pressure sensors 127, 128 are electrically connected to the ECU 5 to supply same with signals indicative of the respective pressure values. Provided across the assist air passage 61 downstream of the pressure sensors 127, 128 (on the fuel injection valve side) is an air pump 126, which is electrically or mechanically driven by the ECU 5 in response to operating conditions of the engine. By virtue of the provision of the air pump 126, the assist air amount can be more suitably controlled in response to engine operating conditions, irrespective of the pressure difference between atmospheric pressure (PA) and the intake pipe absolute pressure PBA.

In the present embodiment, the assist air amount QA is calculated based upon the opening area of the restricion 129 and the pressure values sensed by the pressure sensors 127, 128.

According to the fourth embodiment described above, the intake pipe-adherent fuel amount and the carried-off fuel amount are corrected in response to the assist air amount supplied to a zone in the vicinity of the fuel injection port of the fuel injection valve and the fuel injection amount can be calculated with the assist air supply as well as the intake pipe-adherent fuel amount taken into account, whereby it is possible to accurately control the air-fuel ratio of a mixture supplied to the engine cylinders to a desired value.

Further, according to the fourth embodiment, the intake pipe-adherent fuel amount and the carried-off fuel amount are corrected in response to the heating calory amount, whereby it is possible to more accurately control the air-fuel ratio.

What is claimed is:

1. A control system for an internal combustion engine having at least one combustion chamber, an intake passage having an inner surface, and intake parameter changing means for changing an intake parameter within said intake passage, comprising:
   operating condition detecting means for detecting operating conditions of said engine;
   adherent fuel amount estimating means for estimating an amount of adherent fuel adhering to said inner surface of said intake passage;
   carried-off fuel amount estimating means for estimating an amount of carried-off fuel evaporated from fuel adhering to said inner surface of said intake passage and carried into said combustion chamber;
   supply fuel amount determining means for determining an amount of supply fuel to be supplied to said engine, based upon operating conditions of said engine detected by said operating condition detecting means, said adherent fuel amount estimated by said adherent fuel amount estimating means, and said carried-off fuel amount estimated by said carried-off fuel amount estimating means;
   fuel supply means for supplying said supply fuel amount determined by said supply fuel amount determining means onto said intake passage; and
   estimated fuel amount correcting means for correcting said adherent fuel amount estimated by said adherent fuel amount estimating means, and said carried-off fuel amount estimated by said carried-off fuel amount estimating means, in response to said intake parameter changed by said intake parameter changing means.

2. A control system as claimed in claim 1, wherein said engine has a fuel tank, a canister for adsorbing evaporative fuel generated from said fuel tank, and a purging passage connecting between said canister and said intake passage, said intake parameter being an amount of said evaporative fuel supplied to said intake passage from said canister via said purging passage.

3. A control system as claimed in claim 1, wherein said engine has at least one intake valve, at least one exhaust valve, and valve operating means for changing a valve operating characteristic of at least one of said intake valve and said exhaust valve, said intake parameter being said valve operating characteristic of said at least one of said intake valve and said exhaust valve;

4. A control system as claimed in claim 1, wherein said engine has fuel injection means having an injection port, and auxiliary air supply means for supplying auxiliary air to said fuel injection means at a zone in the vicinity of said injection port, said intake parameter being an amount of said auxiliary air.

5. In a control system for an internal combustion engine having at least one combustion chamber, an intake passage having an inner surface, a fuel tank, a canister for adsorbing evaporative fuel generated from said fuel tank, and a purging passage connecting between said canister and said intake passage, said control system including supply fuel amount calculating means for calculating an amount of supply fuel to be supplied to said engine, based upon operating conditions of said engine;

adherent fuel amount estimating means for estimating an amount of adherent fuel adhering to said inner surface of said intake passage, carried-off fuel amount estimating means for estimating an amount of carried-off fuel amount evaporated from fuel adhering to said inner surface of said intake passage and carried into said combustion chamber, supply fuel amount correction means for correcting said supply fuel amount calculated by said supply fuel amount calculating means, in response to said adherent fuel amount estimated by said adherent fuel amount estimating means and said carried-off fuel amount estimated by said carried-off fuel amount estimating means, and fuel supply means for supplying said supply fuel amount corrected by said supply fuel amount correcting means into said intake passage, the improvement comprising:

(1) evaporative fuel amount detecting means for detecting an amount of evaporative fuel supplied to said intake passage via said purging passage; and (2) estimated fuel amount correcting means for correcting said adherent fuel amount estimated by said adherent fuel amount estimating means and said carried-off fuel amount estimated by said carried-off fuel amount estimating means, in response to said evaporative fuel amount detected by said evaporative fuel amount detecting means.

6. A control system as claimed in claim 5, wherein said estimated fuel amount correcting means corrects said adherent fuel amount and said carried-off fuel amount in response to concentration of hydrocarbon in said evaporative fuel supplied to said intake passage via said purging passage and a flow rate of said evaporative fuel.

7. In a control system for an internal combustion engine having at least one combustion chamber, an intake passage having an inner surface, at least one intake valve, at least one exhaust valve, and valve operating means for changing a valve operating characteristic of at least one of said intake valve and said exhaust valve, said control system including supply fuel amount calculating means for calculating an amount of fuel to be supplied to said engine, based upon operating conditions of said engine, adherent fuel amount estimating means for estimating an amount of adherent fuel adhering to said inner surface of said intake passage, carried-off fuel amount estimating means for estimating an amount of carried-off fuel evaporated from fuel adhering to said inner surface of said intake passage and carried into said combustion chamber, supply fuel amount correcting means for correcting said supply fuel amount calculated by said supply fuel amount calculating means, based upon said adherent fuel amount estimated by said adherent fuel amount estimating means and said carried-off fuel amount estimated by said carried-off fuel amount estimating means, and fuel supply means for supply said supply fuel amount corrected by said fuel amount correcting means into said intake passage, the improvement comprising:

estimated fuel amount correcting means for correcting said adherent fuel amount estimated by said adherent fuel amount estimating means and said carried-off fuel amount estimated by said carried-off fuel amount estimating means, in response to said valve operating characteristic of said at least one said intake valve and said exhaust valve.

8. A control system as claimed in claim 7, wherein said valve operating characteristic includes a low speed valve timing suitable for operation of said engine in a lower rotational speed region of said engine, and a high speed valve timing suitable for operation of said engine in a higher rotational speed region of said engine, said adherent fuel amount and said carried-off fuel amount being each corrected to different values between when said low speed valve timing is selected and when said high speed valve timing is selected.

9. In a control system for an internal combustion engine having at least one combustion chamber, and an intake passage, including supply fuel amount calculating means for calculating an amount of supply fuel amount calculating means for calculating an amount of fuel to be supplied to said engine, based upon operating conditions of said engine, adherent fuel amount estimating means for estimating an amount of adherent fuel adhering to said inner surface of said intake passage, carried-off fuel amount estimating means for estimating an amount of carried-off fuel evaporated from fuel adhering to said inner surface of said intake passage and carried into said combustion chamber, supply fuel amount correcting means for correcting said supply fuel amount calculated by said supply fuel amount calculating means, based upon said adherent fuel amount estimated by said adherent fuel amount estimating means and said carried-off fuel amount estimated by said carried-off fuel amount estimating means, fuel injection means for injecting said supply fuel amount corrected by said supply fuel amount correcting means into said intake passage, said fuel injection means having an injection port, and auxiliary air supply means for supplying auxiliary air to said fuel injection means at a zone in the vicinity of said injection port, the improvement comprising:

estimated fuel amount correcting means for correcting said adherent fuel amount estimated by said adherent fuel amount estimating means and said carried-off fuel amount estimated by said carried-off fuel amount estimating means, in response to an amount of said auxiliary air supplied by said auxiliary air supply means.

10. A control system as claimed in claim 9, wherein said fuel injection means has heating means for heating fuel injected by said fuel injection means, said estimated fuel amount correcting means correcting said adherent fuel amount and said carried-off fuel amount, based upon an amount of heating calory generated by said heating means.

* * * * *